(12) United States Patent
Ly et al.

(10) Patent No.: US 12,048,016 B2
(45) Date of Patent: Jul. 23, 2024

(54) TECHNIQUES FOR MANAGING DISCONTINUOUS OPERATION FOR WIRELESS COMMUNICATION

(71) Applicant: QUALCOMM Incorporated, San Diego, CA (US)

(72) Inventors: Hung Dinh Ly, San Diego, CA (US); Linhai He, San Diego, CA (US); Huilin Xu, Temecula, CA (US); Muhammad Sayed Khairy Abdelghaffar, San Jose, CA (US); Hwan Joon Kwon, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 411 days.

(21) Appl. No.: 17/367,095

(22) Filed: Jul. 2, 2021

(65) Prior Publication Data

US 2023/0007695 A1 Jan. 5, 2023

(51) Int. Cl.
*H04W 74/0833* (2024.01)
*H04W 52/02* (2009.01)
(Continued)

(52) U.S. Cl.
CPC ... *H04W 74/0833* (2013.01); *H04W 52/0235* (2013.01); *H04W 72/121* (2013.01);
(Continued)

(58) Field of Classification Search
None
See application file for complete search history.

(56) References Cited

U.S. PATENT DOCUMENTS

2013/0083749 A1    4/2013   Xu et al.
2019/0082431 A1*   3/2019   Yi ..................... H04W 72/0446
(Continued)

OTHER PUBLICATIONS

Huawei et al., "Correction to Msg1 SCS Configuration [H353] [H354]", 3GPP TSG-RAN WG2 Meeting#103, R2-1812919, 3rd Generation Partnership Project, Mobile Competence Centre, 650, Route Des Lucioles, F-06921 Sophia-Antipolis Cedex, vol. RAN WG2, No. Gothenburg, Sweden, Aug. 20, 2018-Aug. 24, 2018 Aug. 10, 2018, XP051522504, 7 Pages.
(Continued)

*Primary Examiner* — Jutai Kao
(74) *Attorney, Agent, or Firm* — QUALCOMM IP DEPT.; James Hunt Yancey, Jr.

(57) ABSTRACT

Methods, systems, and devices for wireless communications are described. A communication device, such as a user equipment (UE) may receive control signaling indicating a set of configurations including a set of random access channel (RACH) configurations or a set of scheduling request (SR) configurations. At least one RACH configuration of the set of RACH configurations includes a UE-group common RACH configuration or at least one SR configuration of the set of SR configurations includes a UE-group common SR configuration. The UE may select one or more configurations of the set of RACH configurations or the set of SR configurations based on receiving the control signaling and may perform the wireless communications.

30 Claims, 16 Drawing Sheets

(51) Int. Cl.
  *H04W 72/121* (2023.01)
  *H04W 72/1263* (2023.01)
  *H04W 72/23* (2023.01)
  *H04W 74/00* (2009.01)
  *H04W 76/28* (2018.01)
(52) U.S. Cl.
  CPC ....... *H04W 72/1263* (2013.01); *H04W 72/23* (2023.01); *H04W 74/006* (2013.01); *H04W 76/28* (2018.02)

(56) References Cited

U.S. PATENT DOCUMENTS

| | | | |
|---|---|---|---|
| 2019/0159261 A1* | 5/2019 | Jung | H04W 72/542 |
| 2020/0252967 A1* | 8/2020 | Ozturk | H04W 74/0833 |
| 2021/0168869 A1* | 6/2021 | Gupta | H04L 27/2607 |
| 2021/0298108 A1* | 9/2021 | Wu | H04W 56/0045 |
| 2022/0124633 A1* | 4/2022 | Hoshino | H04B 7/0634 |
| 2023/0156688 A1* | 5/2023 | Kuang | H04W 76/11 370/329 |
| 2023/0180301 A1* | 6/2023 | Seidel | H04W 74/006 370/329 |

OTHER PUBLICATIONS

International Search Report and Written Opinion—PCT/US2022/029549—ISA/EPO—Jul. 27, 2022.

\* cited by examiner

TECHNIQUES FOR MANAGING DISCONTINUOUS OPERATION FOR WIRELESS COMMUNICATION

FIELD OF TECHNOLOGY

The following relates to wireless communications, including techniques for managing discontinuous operation for wireless communication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for managing discontinuous operation for wireless communication. Generally, the described techniques provide for configuring one or multiple UE with random access channel (RACH) configurations or scheduling request (SR) configurations operating in a discontinuous reception (DRX) mode. In some cases, these wireless communication systems may configure a group of UEs with one or more of a RACH or an SR configuration to match the UEs DRX configuration for power saving by aligning one or more the RACH configurations or SR configurations across the group of UEs. The RACH configurations and SR configurations may be UE-specific or may be UE-group common configurations. The UE may indicate a capability to the base station for implementing UE-group common RACH or SR configurations. For example, the UE may support UE-specific RACH and SR configurations. Otherwise, the UE may be capable of supporting both UE-specific RACH and SR configurations and UE-group common RACH and SR configurations for power savings at the UEs and at the base stations in the network.

A method for wireless communication at a UE is described. The method may include receiving, from a base station, control signaling indicating a set of configurations including a set of RACH configurations or a set of SR configurations, where at least one RACH configuration of the set of RACH configurations includes a UE-group common RACH configuration or at least one SR configuration of the set of SR configurations includes a UE-group common SR configuration, selecting one or more configurations of the set of RACH configurations or the set of SR configurations based on receiving the control signaling, and performing the wireless communication based on the selecting.

An apparatus for wireless communication at a UE is described. The apparatus may include a processor, memory coupled with the processor, and instructions stored in the memory. The instructions may be executable by the processor to cause the apparatus to receive, from a base station, control signaling indicating a set of configurations including a set of RACH configurations or a set of SR configurations, where at least one RACH configuration of the set of RACH configurations includes a UE-group common RACH configuration or at least one SR configuration of the set of SR configurations includes a UE-group common SR configuration, select one or more configurations of the set of RACH configurations or the set of SR configurations based on receiving the control signaling, and perform the wireless communication based on the selecting.

Another apparatus for wireless communication at a UE is described. The apparatus may include means for receiving, from a base station, control signaling indicating a set of configurations including a set of RACH configurations or a set of SR configurations, where at least one RACH configuration of the set of RACH configurations includes a UE-group common RACH configuration or at least one SR configuration of the set of SR configurations includes a UE-group common SR configuration, means for selecting one or more configurations of the set of RACH configurations or the set of SR configurations based on receiving the control signaling, and means for performing the wireless communication based on the selecting.

A non-transitory computer-readable medium storing code for wireless communication at a UE is described. The code may include instructions executable by a processor to receive, from a base station, control signaling indicating a set of configurations including a set of RACH configurations or a set of SR configurations, where at least one RACH configuration of the set of RACH configurations includes a UE-group common RACH configuration or at least one SR configuration of the set of SR configurations includes a UE-group common SR configuration, select one or more configurations of the set of RACH configurations or the set of SR configurations based on receiving the control signaling, and perform the wireless communication based on the selecting.

Some examples of the method, apparatuses, and non-transitory computer-readable medium described herein may further include operations, features, means, or instructions for enabling a power saving mode based on selecting the one or more configurations, where performing the wireless communication may be based on enabling the power saving mode.

Some examples of the method, apparatuses, and non-transitory computer-readable medium described herein may further include operations, features, means, or instructions for selecting a UE-specific RACH configuration based on receiving an indication, switching from a baseline UE-specific RACH configuration to the selected UE-specific RACH configuration, and where performing the wireless communication may be based on the switching.

Some examples of the method, apparatuses, and non-transitory computer-readable medium described herein may further include operations, features, means, or instructions for selecting the UE-group common RACH configuration based on receiving an indication, switching from a baseline UE-group common RACH configuration to the selected UE-group common RACH configuration, and where performing the wireless communication may be based on the switching.

Some examples of the method, apparatuses, and non-transitory computer-readable medium described herein may further include operations, features, means, or instructions for selecting a UE-specific SR configuration based on receiving an indication, switching from a baseline UE-specific SR configuration to the selected UE-specific SR configuration, and where performing the wireless communication may be based on the switching.

Some examples of the method, apparatuses, and non-transitory computer-readable medium described herein may further include operations, features, means, or instructions for selecting the UE-group common SR configuration based on receiving an indication, switching from a baseline UE-group common SR configuration to the selected UE-group common SR configuration, and where performing the wireless communication may be based on the switching.

In some examples of the method, apparatuses, and non-transitory computer-readable medium described herein, receiving the control signaling may include operations, features, means, or instructions for receiving a radio resource control (RRC) message indicating the set of configurations including one or more of the set of RACH configurations or the set of SR configurations.

Some examples of the method, apparatuses, and non-transitory computer-readable medium described herein may further include operations, features, means, or instructions for transmitting information associated with a capability of the UE to select between different RACH configurations or different SR configurations and where receiving the control signaling may be based on transmitting the information.

Some examples of the method, apparatuses, and non-transitory computer-readable medium described herein may further include operations, features, means, or instructions for receiving an indication of one or more RACH configurations of the set of RACH configurations or one or more SR configurations of the set of SR configurations and where selecting the one or more configurations may be based on receiving the indication.

In some examples of the method, apparatuses, and non-transitory computer-readable medium described herein, receiving the indication may include operations, features, means, or instructions for receiving DCI that includes the indication and where selecting the one or more configurations may be based on receiving the DCI.

In some examples of the method, apparatuses, and non-transitory computer-readable medium described herein, the DCI includes a UE-specific DCI format and the UE-specific DCI format may be based on the DCI scheduling one or more of a physical uplink shared channel or a physical downlink shared channel.

In some examples of the method, apparatuses, and non-transitory computer-readable medium described herein, the DCI includes a UE-group DCI format.

Some examples of the method, apparatuses, and non-transitory computer-readable medium described herein may further include operations, features, means, or instructions for monitoring a physical downlink control channel based on a capability of the UE and where receiving the indication may be based on monitoring the physical downlink control channel.

In some examples of the method, apparatuses, and non-transitory computer-readable medium described herein, receiving the indication may include operations, features, means, or instructions for receiving a MAC-CE that includes the indication and where selecting the one or more configurations may be based on receiving the MAC-CE.

In some examples of the method, apparatuses, and non-transitory computer-readable medium described herein, the one or more configurations correspond to a separate power mode different than a baseline power mode associated with one or more of a baseline configuration.

In some examples of the method, apparatuses, and non-transitory computer-readable medium described herein, the set of RACH configurations includes one or more UE-specific RACH configurations and one or more UE-group common RACH configurations and the set of SR configurations includes one or more UE-specific SR configurations and one or more UE-group common SR configurations.

A method for wireless communication at a base station is described. The method may include transmitting, to a UE, control signaling indicating a set of configurations including a set of RACH configurations or a set of SR configurations, where at least one RACH configuration of the set of RACH configurations includes a UE-group common RACH configuration or at least one SR configuration of the set of SR configurations includes a UE-group common SR configuration, selecting one or more configurations of the set of RACH configurations or the set of SR configurations based on transmitting the control signaling, and performing the wireless communication based on the selecting.

An apparatus for wireless communication at a base station is described. The apparatus may include a processor, memory coupled with the processor, and instructions stored in the memory. The instructions may be executable by the processor to cause the apparatus to transmit, to a UE, control signaling indicating a set of configurations including a set of RACH configurations or a set of SR configurations, where at least one RACH configuration of the set of RACH configurations includes a UE-group common RACH configuration or at least one SR configuration of the set of SR configurations includes a UE-group common SR configuration, select one or more configurations of the set of RACH configurations or the set of SR configurations based on transmitting the control signaling, and perform the wireless communication based on the selecting.

Another apparatus for wireless communication at a base station is described. The apparatus may include means for transmitting, to a UE, control signaling indicating a set of configurations including a set of RACH configurations or a set of SR configurations, where at least one RACH configuration of the set of RACH configurations includes a UE-group common RACH configuration or at least one SR configuration of the set of SR configurations includes a UE-group common SR configuration, means for selecting one or more configurations of the set of RACH configurations or the set of SR configurations based on transmitting the control signaling, and means for performing the wireless communication based on the selecting.

A non-transitory computer-readable medium storing code for wireless communication at a base station is described. The code may include instructions executable by a processor to transmit, to a UE, control signaling indicating a set of configurations including a set of RACH configurations or a set of SR configurations, where at least one RACH configuration of the set of RACH configurations includes a UE-group common RACH configuration or at least one SR configuration of the set of SR configurations includes a UE-group common SR configuration, select one or more configurations of the set of RACH configurations or the set of SR configurations based on transmitting the control signaling, and perform the wireless communication based on the selecting.

In some examples of the method, apparatuses, and non-transitory computer-readable medium described herein, transmitting the control signaling may include operations, features, means, or instructions for transmitting an RRC message indicating the set of configurations including one or more of the set of RACH configurations or the set of SR configurations.

Some examples of the method, apparatuses, and non-transitory computer-readable medium described herein may further include operations, features, means, or instructions for receiving information associated with a capability of the UE to select between different RACH configurations or different SR configurations and where transmitting the control signaling may be based on receiving the information.

Some examples of the method, apparatuses, and non-transitory computer-readable medium described herein may further include operations, features, means, or instructions for transmitting an indication of one or more RACH configurations of the set of RACH configurations or one or more SR configurations of the set of SR configurations and where selecting the one or more configurations may be based on transmitting the indication.

In some examples of the method, apparatuses, and non-transitory computer-readable medium described herein, transmitting the indication may include operations, features, means, or instructions for transmitting DCI that includes the indication and where selecting the one or more configurations may be based on transmitting the DCI.

In some examples of the method, apparatuses, and non-transitory computer-readable medium described herein, the DCI includes a UE-specific DCI format and the UE-specific DCI format may be based on the DCI scheduling one or more of a physical uplink shared channel or a physical downlink shared channel.

In some examples of the method, apparatuses, and non-transitory computer-readable medium described herein, the DCI includes a UE-group DCI format.

In some examples of the method, apparatuses, and non-transitory computer-readable medium described herein, transmitting the indication may include operations, features, means, or instructions for transmitting a MAC-CE that includes the indication and where selecting the one or more configurations may be based on transmitting the MAC-CE.

In some examples of the method, apparatuses, and non-transitory computer-readable medium described herein, the one or more configurations correspond to a separate power mode different than a baseline power mode associated with one or more of a baseline configuration.

Some examples of the method, apparatuses, and non-transitory computer-readable medium described herein may further include operations, features, means, or instructions for enabling a power saving mode based on selecting the one or more configurations and where performing the wireless communication may be based on enabling the power saving mode.

In some examples of the method, apparatuses, and non-transitory computer-readable medium described herein, the set of RACH configurations includes one or more UE-specific RACH configurations and one or more UE-group common RACH configurations.

In some examples of the method, apparatuses, and non-transitory computer-readable medium described herein, the set of SR configurations includes one or more UE-specific SR configurations and one or more UE-group common SR configurations.

DETAILED DESCRIPTION

Figure 1:
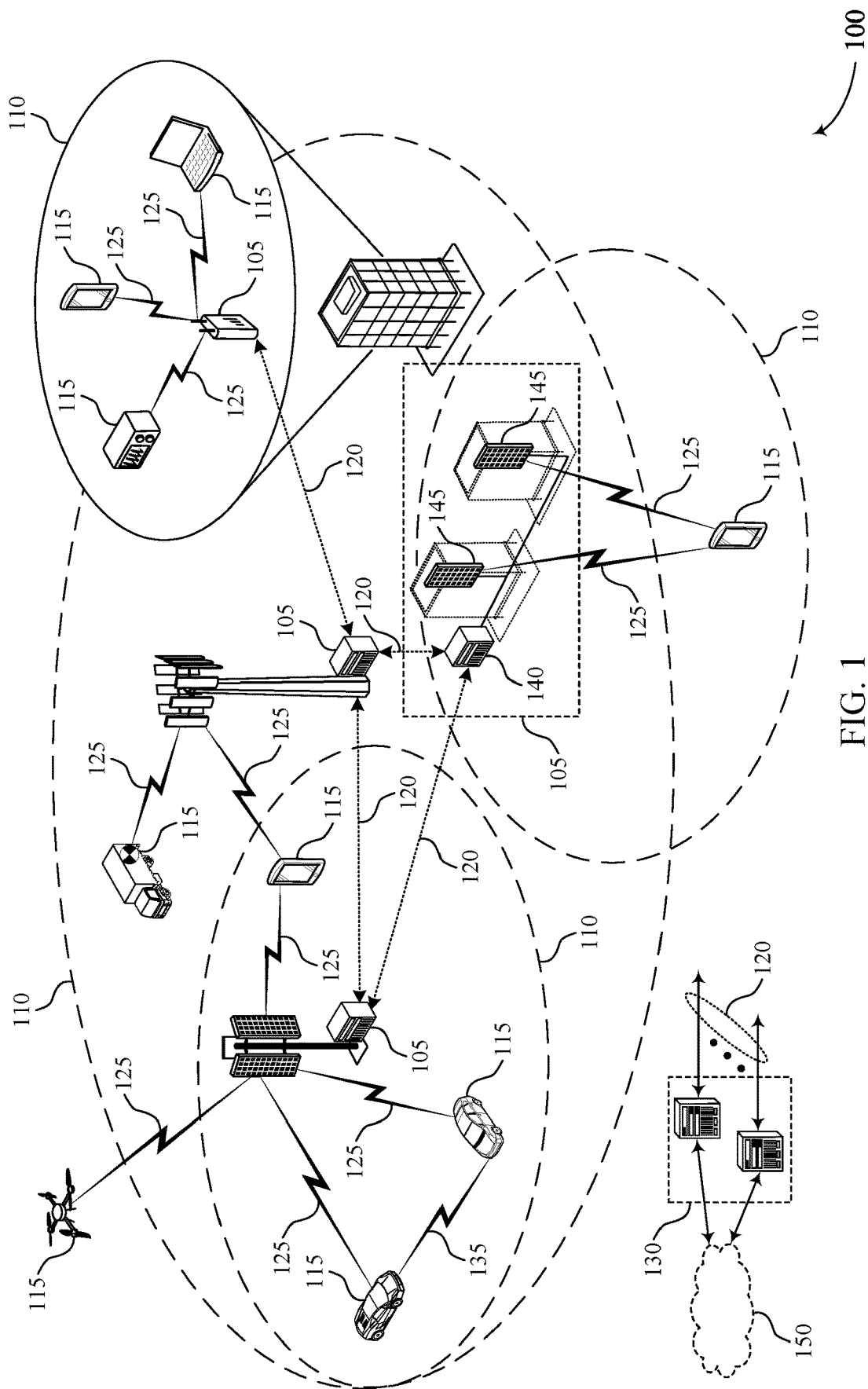
FIGS. 1 and 2 illustrate examples of wireless communications systems that support techniques for managing discontinuous operation for wireless communication in accordance with aspects of the present disclosure.

Some wireless communications systems (e.g., 5G NR cellular networks) that support larger bandwidths, higher frequencies and more antennas may be associated with relatively higher power consumption. To reduce power consumption in these wireless communications systems, a communication device (e.g., a base station or a UE) may enter a DRX cycle or a discontinuous transmission (DTX) cycle. A communication device in a DRX cycle may periodically switch between an active reception state (in which the communication device monitors for transmissions from other communication devices) and an inactive reception state (in which the communication device does not monitor for transmissions from other communication devices). Likewise, a communication device in a DTX cycle may periodically switch between an active transmission state (in which the communication device may transmit messages to other communication devices) and an inactive transmission state (in which the communication device does not transmit messages to other communication devices).

A communication device that remains in an inactive mode (e.g., an inactive reception state or an inactive transmission state) for a longer duration may experience greater power savings. In some cases, however, a communication device in a DRX cycle may be scheduled to receive a message during an inactive reception period (e.g., while the communication device is in an inactive reception state). In other cases, a communication device may receive an unscheduled message (e.g., a RACH message or an SR) from another communication device during an inactive reception period. Likewise, a communication device in a DTX cycle may be scheduled to transmit a message during an inactive transmission period. In such cases, the communication devices may spend less time in an inactive mode and may experience limited power savings. Further, if a communication device (such as a base station) communicates with many other communication devices (such as UEs), it may more challenging for the communication device to enter an inactive period and save power because of the many demands of the other communication devices. To improve a likelihood that a communication device (such as a base station) can enter inactive periods and save power, the inactive periods of other communication devices may be coordinated.

In accordance with aspects of the present disclosure, a first communication device (e.g., a base station) may experience greater power savings while operating in a DRX mode based on configuring one or more communication devices (e.g., UEs) in a network with a set of RACH configurations, a set of SR configurations, or both. The RACH configurations may align RACH opportunities across the one or more communication devices such that the first communication device receives RACH messages from the one or more communication in a limited number of frames. Similarly, the SR configurations may align SR opportunities across the one or more communication devices such that the first communication device receives SR from the one or more communication devices in a controlled number of frames. Reducing the number of frames in which the first communication device receives transmissions (e.g., RACH messages or SR) from the one or more communication devices may enable the first communication device to remain in an inactive reception state for a longer duration, which may reduce overall network power consumption.

In some examples, the first communication device may transmit control signaling to the one or more communication devices that indicates the set of RACH configurations, the set of SR configurations, or both. The set of RACH configurations may include a first RACH configuration for some wireless communications and may include a second RACH configuration for increased power savings wireless communications. Likewise, the set of SR configurations may include a first SR configuration for some wireless communications and may include a second SR configuration for increased power savings wireless communications. The one or more communication devices may select a RACH configuration, an SR configuration, or both based on the control signaling, and may perform wireless communications with the first communication device based on the selected configurations.

Additionally or alternatively, the first communication device may configure the one or more communication devices with various network power saving features associated with the indicated configurations via control information. For example, the first communication device may transmit an indication of which RACH or SR configuration to implement in a downlink control information (DCI) or a medium access control-control element (MAC-CE). In some examples, the DCI may be a UE-specific DCI or may be a UE-group common DCI. The one or more communication devices may enable these features when using a RACH configuration or an SR configuration to communicate with the first communication device.

Aspects of the present disclosure may provide one or more advantages. For example, the described techniques may provide for reduced network power consumption based on a first communication device (e.g., a base station) configuring one or more communication devices (e.g., UEs) with a group common RACH configuration, a group common SR configuration, or both. These configurations may enable the first communication device to remain in an inactive mode (e.g., a low-power state) for a longer duration by reducing a number of frames in which the first communication device receives RACH messages or SR from the one or more communication devices. As a result, the first communication device may spend more time in an inactive mode and may experience greater power savings, among other benefits.

Aspects of the disclosure are initially described in the context of wireless communications systems. Aspects of the disclosure are then described in the context of a communications scheme and a process flow. Aspects of the disclosure are further illustrated by and described with reference to apparatus diagrams, system diagrams, and flowcharts that relate to techniques for managing discontinuous operation for wireless communication.

FIG. 1 illustrates an example of a wireless communications system 100 that supports techniques for managing discontinuous operation for wireless communication in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In the wireless communications system 100, a UE 115 may receive, from a base station 105, control signaling indicating a set of configurations including a set of RACH configurations or a set of SR configurations. In some examples the set of RACH configurations includes a UE-group common RACH configurations or the set of SR configurations includes a UE-group common SR configurations. The UE 115 may select one or more configurations of the set of RACH configurations or the set of SR configurations based on receiving the control signaling and may perform the wireless communication based on the selecting.

By configuring the UE 115 with the RACH/SR configurations may increase power savings at the base station 105 and reduce overall power consumption in the wireless communications system 100. The RACH/SR configurations may align RACH/SR transmissions of the UE 115 such that the base station 105 may communicate with the UEs 115 in a reduced number of frames. As such, the base station 105 may remain in an inactive mode (e.g., sleep mode) for a longer duration while operating in a DRX mode, which may enable the base station 105 to experience reduced power consumption and improved DRX efficiency, among other benefits.

Figure 2:
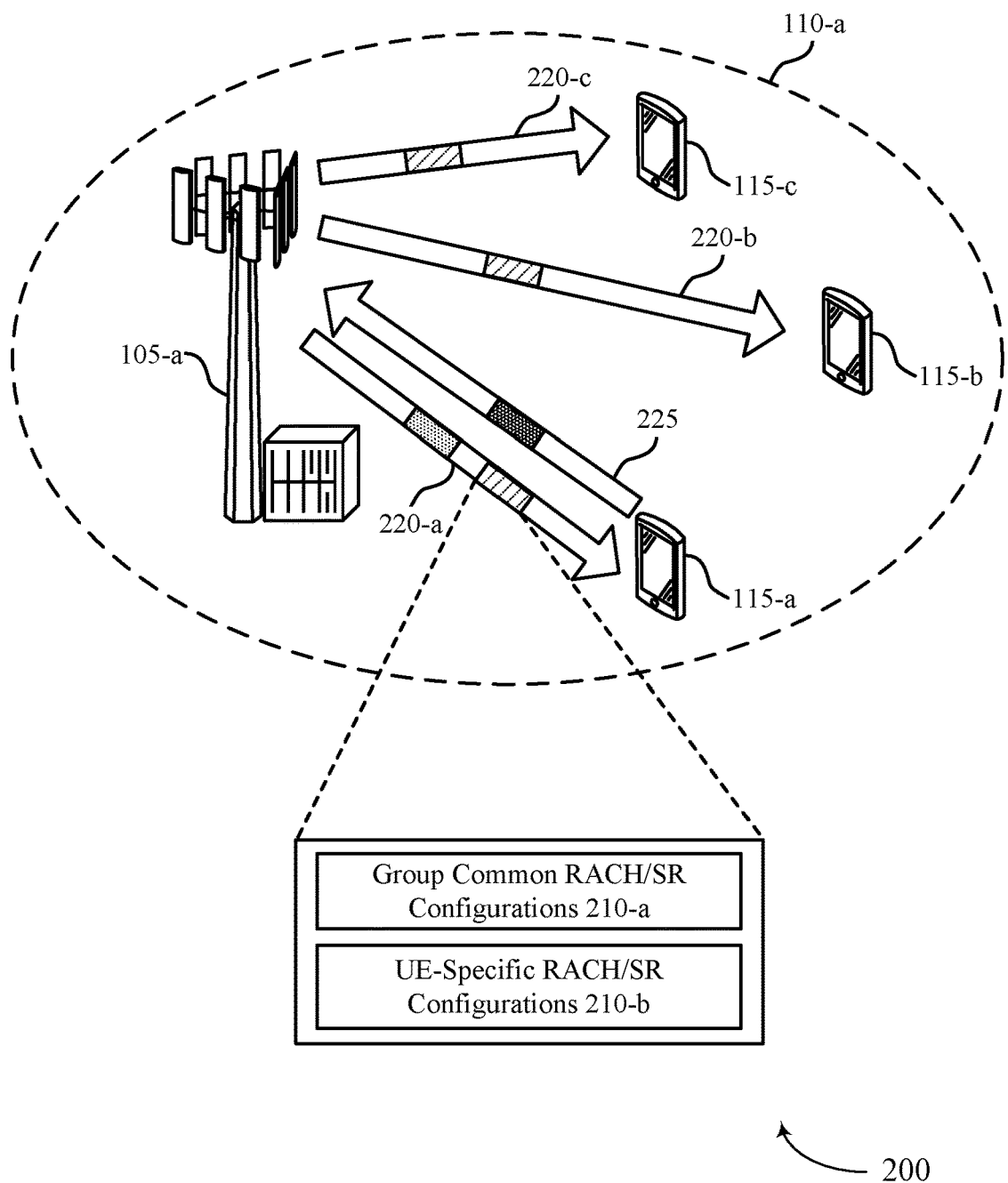

FIG. 2 illustrates an example of a wireless communications system 200 that supports techniques for managing discontinuous operation for wireless communication in accordance with aspects of the present disclosure. The wireless communications system 200 may implement or be implemented by aspects of the wireless communications system 100. For example, the wireless communications system 200 may include a base station 105-a, a UE 115-a, a UE 115-b, and a UE 115-c, which may be examples of corresponding devices described with reference to FIG. 1. The base station 105-a may communicate with the UEs 115 in a geographic coverage area 110-a, which may be an example of a geographic coverage area 110 described with reference to FIG. 1.

The base station 105-a may configure the UEs 115 with one or more of a set of RACH configuration or SR configurations. For example, the base station 105-a may configure the UE 115-a with a set of UE-specific RACH configurations and a set of group-common RACH configurations or a set of UE-specific SR configurations and a set of UE-group common SR configurations over a communication link 220-a, may configure the UE 115-b with a second set of UE-specific RACH configurations and the set of group-common RACH configurations or a second set of UE-specific SR configurations and the set of UE-group common SR configurations over a communication link 220-b, and may configure the UE 115-c with a third set of UE-specific RACH configurations and the set of group-common RACH configurations or a third set of UE-specific SR configurations and the set of UE-group common SR configurations over a communication link 220-c. One or more of the RACH configurations or the SR configurations may enable the UEs 115 to align one or more of the RACH transmissions or the SR transmissions. The base station 105-a may be configured with a DRX configuration that enables the base station 105-a to conserve power by operating in a sleep mode during inactive periods and thus may remain if the sleep mode for longer durations of time if one or more of the RACH transmissions or the SR transmissions associated with the UEs 115 are aligned.

One or more of the RACH configurations or the SR configurations may specify a periodicity, time resources, frequency resources, or any combination thereof in which the UEs 115 are configured to transmit RACH or SRs to the base station 105-a. The base station 105-a may experience improved power savings by reducing a number of wake-up occasions if RACH or SR communications from the UEs 115 are transmitted according to a same or similar schedule. In some cases, the UEs 115 may be configured with different RACH or SR configurations such that the UEs 115 may transmit RACH or SR according to a plurality of power-saving modes (e.g., corresponding to a light sleep mode, a deep sleep mode, etc. of the base station), which may impact power savings at the base station 105-a.

The base station 105-a may align one or more RACH transmissions or SR transmissions of the UEs 115 by configuring the UEs 115 with a same UE-specific or UE-group common RACH configuration or SR configuration. That is, the base station 105-a may use a UE-specific configuration or a UE-group common configuration to align communications from the UEs 115 and achieve network power savings. In some cases, the UE-specific C-DRX configuration may increase temporal alignment between the UEs 115 by setting an inactivity timer of the UEs 115 to a specific value (e.g., 0). However, because the base station 105-a configures the UEs 115 with a RACH or SR configuration during an RRC configuration period (e.g., via RRC signaling), this may impact scheduling for some of the UEs 115.

In the example of FIG. 2, the base station 105-a may transmit RRC signaling to the UEs 115 which may configure the UEs 115 with a set of UE-group common RACH/SR configurations 210-a and a set of UE-specific RACH/SR configurations 210-b based on a capability indication received from the UE 115 (e.g., UE 115-a). For example, the capability indication may indicate a capability of the UE 115-a to select between different RACH configurations or different SR configurations. For example, some UE 115 may be capable of receiving UE-group common control information while other may not. The base station 105-a may configure the UEs 115 with multiple UE-group common RACH/SR configurations 210-a, UE-specific RACH/SR configurations 210-b, or both and may dynamically indicate one of these configurations via dynamic signaling 230 (e.g., via DCI or MAC-CE) based on receiving the indication. In some examples, the base station 105-a may also configure the UEs 115 with other network power saving features associated with the configurations 210. After receiving the indication of the configuration 210, the UEs 115 select a configuration 210 or may activate network power saving features (e.g., procedures specified for enhanced network power savings such as a transmission schedule) associated with the indicated configuration received via dynamic signaling 230, or both. That is, receiving dynamic signaling 230 or RRC signaling 205 may trigger (e.g., turn on) network power saving features at the UEs 115.

The base station 105-a may configure the UEs 115 (e.g., via RRC signaling) with different configurations intended for network power savings at the base station 105-a. The RACH/SR configurations 210 may correspond to different sleep modes (e.g., light sleep, deep sleep) of the base station 105-a. For example, the base station 105-a may configure the UEs 115 with a particular RACH/SR configuration based on a DRX cycle of the base station 105-a or the UEs 115. That is, configuring the UEs 115 with different RACH/SR configurations may enable the base station 105-a to dynamically adjust a transmission schedule of the UEs 115 based on a sleep schedule of the base station 105-a.

The base station 105-a may also configure the UEs 115 with network power saving features associated with different RACH/SR configurations. For example, the base station 105-a may configure the UE 115-b to use different channel state information (CSI) reporting techniques, beam configurations, or transmit powers in combination with different configurations 210, which may further improve power savings at the base station 105-*a*. Thus, if the UEs 115 receive the dynamic signaling 230 or the RRC signaling 205 from the base station 105-*a*, the UEs 115 may activate network power saving features associated with the RACH/SR configurations 210.

In some examples, the base station 105-*a* may indicate the configurations 210 to the UEs 115 via dynamic signaling. For example, UE-group common RACH/SR configurations may be indicated via DCI and UE-specific RACH/SR configurations may be indicated via DCI or MAC-CE. For example, the base station 105-*a* may indicate the UE-group common RACH/SR configuration 210-*a* via a UE group DCI with a specific DCI format (e.g., DCI format 2_0 for dynamic slot format indicators or DCI format 2_6 for wake up signals). In some examples, the base station 105-*a* may indicate the UE-specific RACH/SR configuration 210-*b* via a UE-specific DCI with a specific DCI format (e.g., DCI format 0_1 for physical uplink shared channel (PUSCH) scheduling or DCI format 1_1 for physical downlink shared channel (PDSCH) scheduling). In response to receiving the dynamic signaling 230, the UEs 115 may use the indicated configuration 210 to communicate with the base station 105-*a*. In some example, receiving the dynamic indication may override a default RACH/SR configuration implemented by the UEs 115.

In some examples, the RACH/SR configurations 210 may overwrite existing RACH/SR configurations or default RACH/SR configurations of the UEs 115. For example, if the base station 105-*a* configures the UE 115-*a* with a set of UE specific RACH/SR configurations configuration (e.g., specific to the UE 115-*a*) via RRC signaling and subsequently indicates a configuration to the UE 115-*a* via dynamic signaling 230, the UE 115-*a* may switch from a default RACH/SR configuration to the indicated configuration received via dynamic signaling 230. In some examples, the default configurations of the UEs 115 may correspond to a normal operating mode of the base station 105-*a* or a power saving mode (e.g., a DRX mode) of the base station 105-*a*.

Configuring the UEs 115 with the configurations 210 may increase power savings at the base station 105-*a* and reduce overall power consumption in the wireless communications system 200. The configurations 210 may align RACH/SR transmissions of the UEs 115 such that the base station 105-*a* may communicate with the UEs 115 in a reduced number of frames. Additionally, transmitting UE-group common configurations may reduce signaling overhead as the base station 105-*a* may refrain from transmitting UE-specific configurations. As such, the base station 105-*a* may remain in an inactive mode (e.g., sleep mode) for a longer duration while operating in a DRX mode, which may enable the base station 105-*a* to experience reduced power consumption and improved DRX efficiency, among other benefits.

Figure 3:
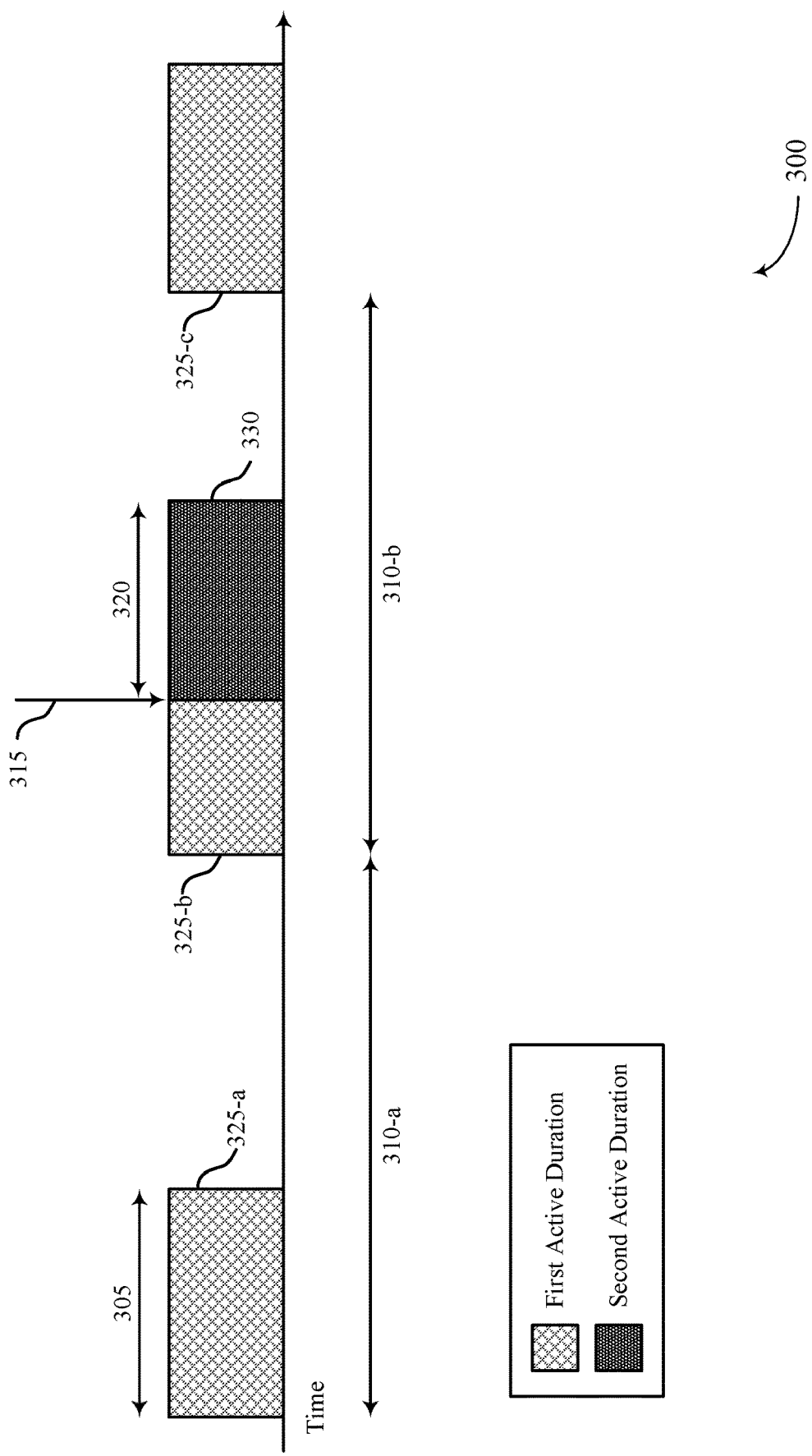
FIG. 3 illustrates an example of a communications scheme that supports techniques for managing discontinuous operation for wireless communication in accordance with aspects of the present disclosure.

FIG. 3 illustrates an example of a communications scheme 300 that supports techniques for managing discontinuous operation for wireless communication in accordance with aspects of the present disclosure. The communications scheme 300 may implement or be implemented by aspects of the wireless communications system 100 or the wireless communications system 200. For example, the communications scheme 300 may be implemented by a base station 105 or a UE 115, which may be examples of corresponding devices described with reference to FIG. 1.

A base station 105 may configure a UE 115 with a DRX configuration (e.g., via RRC signaling). In some examples, the base station 105 may also be configured with a DRX configuration. In some examples, the base station 105 may have a DRX that is fully or partially aligned with a DRX configuration of the UE 115. The DRX configuration shown in FIG. 3 is for illustrative purposes only and may be performed by the UE 115 or base station 105. The DRX configuration may include an active duration 305, cycle durations 310, an inactivity timer 320, and a timing offset 335. The active duration 305 may refer to a time duration in which the UE 115 or the base station 105 is configured to be in an active mode. The UE 115 may be configured to monitor a physical downlink control channel (PDCCH) during the active duration 305 of the UE 115 or may be configured to transmit control signaling or data during the active duration 305 of the base station 105. The base station 105 may be configured to transmit PDCCH during the active duration 305 of the UE 115 or may be configured to receive control signaling or data from the UE 115 during the active duration 305 of the base station 105. In some cases, the active duration 305 may also be referred to as an ON duration, a DRX active time, or an active reception period, among other examples.

The cycle durations 310 may refer to a time period between active durations 305. For example, a cycle duration 310-*a* may refer to a duration between a first time at which the UE 115 or the base station 105 is configured to enter an active mode 325-*a* and a second time at which the UE 115 or the base station 105 is configured to enter an active mode 325-*b*. Likewise, a cycle duration 310-*b* may refer to a duration between the second time at which the UE 115 or the base station 105 is configured to enter the active mode 325-*b* and a third time at which the UE 115 or the base station 105 is configured to enter an active mode 325-*c*. In some cases, the cycle durations 310 may also be referred to as DRX cycle durations, C-DRX cycle durations, or cycle lengths, among other examples. The active modes 325 may also be referred to as active reception modes, C-DRX modes, or DRX modes, among other examples.

The inactivity timer 320 may refer to a time duration for which the UE 115 is configured to remain in an active mode after receiving a PDCCH transmission. In some examples, inactivity timer 320 may refer to a time duration for which the UE 115 is configured to remain in an active mode after receiving a PUSCH transmission, or other transmission for example. The UE 115 may remain in an active mode 330 (e.g., for a time duration that corresponds to the inactivity timer 320) after receiving a transmission 315 (e.g., PDCCH) from the base station 105. Similarly, the base station 105 may remain in an active mode 330 (e.g., for a time duration that corresponds to the inactivity timer 320) after receiving a transmission 315 (e.g., PUSCH) from the UE 115. In some cases, the inactivity timer 320 may also be referred to as a DRX inactivity timer. The timing offset 335 may refer to a time period between the beginning of a scheduling unit (e.g., frame, subframe, slot) and the first time at which the UE 115 or the base station 105 is configured to enter the active mode 325-*a*. The timing offset 335 may also be referred to as an offset parameter or a frame offset, among other examples.

In accordance with the DRX configuration, the UE 115 may enter a sleep mode during periods of inactivity. For example, if the UE 115 is not configured to be in an active mode 325 and the inactivity timer 320 has expired (e.g., if the UE 115 has not recently received any PDCCH transmissions), the UE 115 may enter a sleep mode to conserve power. Similarly, if the base station 105 is not configured to be in an active mode 325 and the inactivity timer 320 has expired (e.g., if the base station has not recently received any PUSCH transmissions), the base station 105 may enter a sleep mode to conserve power. The base station 105 may remain in the sleep mode until the base station 105 is scheduled to receive signaling or until the base station 105 is configured to return to an active mode 325. In some examples, the UE 115 may be configured to transmit signaling such as a RACH message or an SR when the base station 105 is in the sleep mode.

In some cases, the base station 105 may experience reduced power consumption if transmissions of the UE 115 align with transmissions of a second UE 115. For example, if the UE 115 and the second UE 115 are scheduled to transmit in the same frames, the base station 105 may communicate with the UE 115 and the second UE 115 in these frames and may enter a sleep mode in other frames (e.g., frames in which the UE 115 and the second UE 115 are not transmitting) and, in some cases, may be able to skip one or more active durations 305. In some cases, the UE 115 and the second UE 115 may be configured with a RACH configuration, or an SR configuration, or both. In some cases, however, the UE 115 and the second UE 115 may have different RACH or SR configurations and may cause the base station 105 to wake up in different frames. As a result, the base station 105 may be active in more frames and may spend less time in sleep mode.

In accordance with the described techniques, the base station 105 may experience improved power savings by configuring the UE 115 and the second UE 115 with a same or similar RACH configuration or SR configuration (e.g., a group-common RACH configuration or a group-common SR configuration). For example, the base station 105 may configure the UE 115 and the second UE 115 each with a set of group-common RACH configurations or group-common SR configurations that allows the base station 105 to remain in the sleep mode for longer durations. The RACH configurations or SR configurations may align RACH transmission or SR transmission of the UEs 115 such that communications between the base station 105, the UE 115, and the second UE 115 are concentrated in the same time resources (e.g., slots, frames). As such, the base station 105 may remain in sleep mode for a longer duration and may experience greater power savings, which may reduce overall network power consumption.

Figure 4:
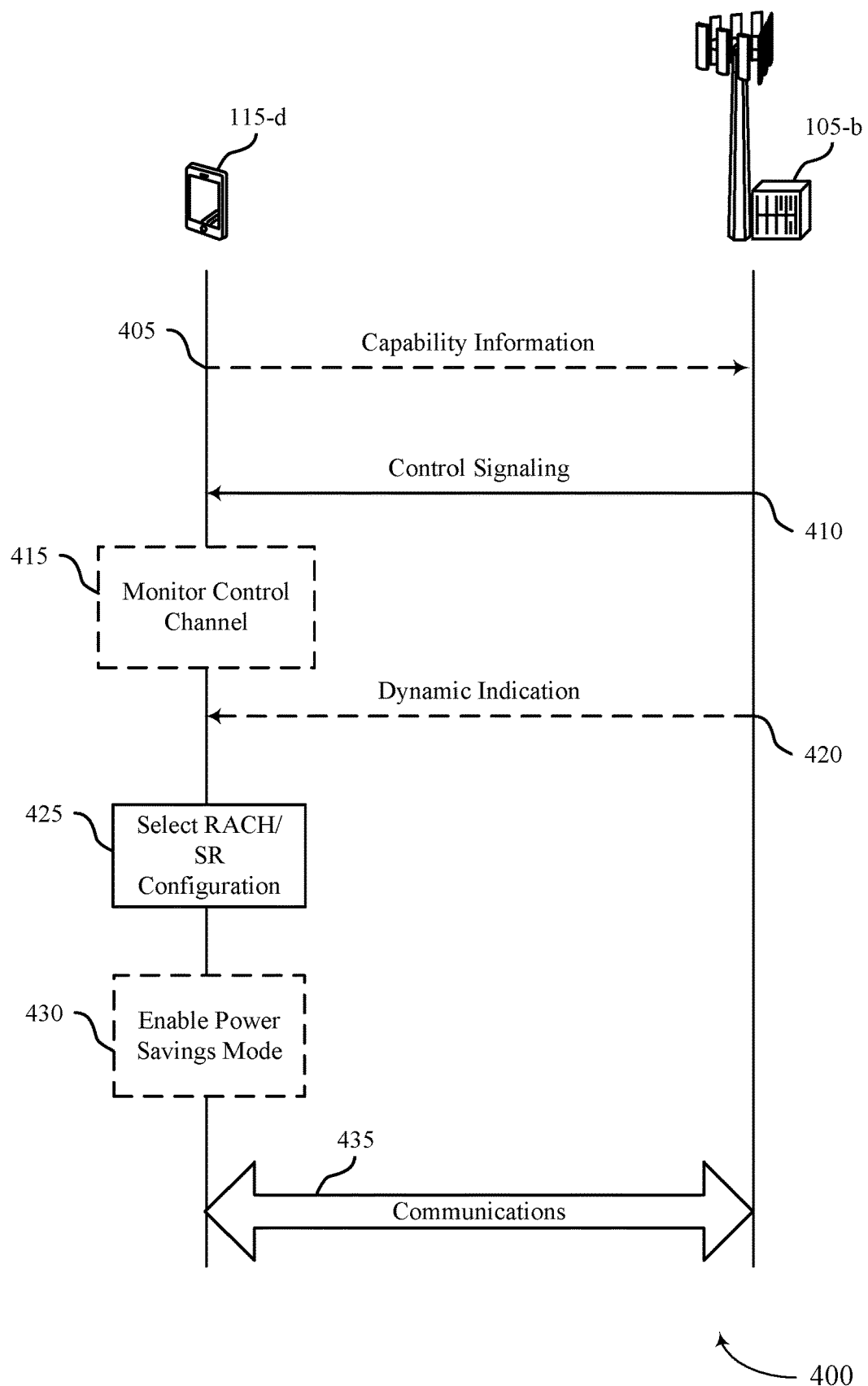
FIG. 4 illustrates an example of a process flow that supports techniques for managing discontinuous operation for wireless communication in accordance with aspects of the present disclosure.

FIG. 4 illustrates an example of a process flow 400 that supports techniques for managing discontinuous operation for wireless communication in accordance with aspects of the present disclosure. The process flow 400 may implement or be implemented by aspects of the wireless communications system 100 or the wireless communications system 200. For example, the process flow 400 may include a base station 105-*b* and a UE 115-*d*, which may be examples of corresponding devices described with reference to FIGS. 1 and 2. In the following description of the process flow 400, operations between the base station 105-*b* and the UE 115-*d* may be performed in a different order or at a different time than as shown. Additionally or alternatively, some operations may be omitted from the process flow 400, and other operations may be added to the process flow 400.

At 405, the UE 115-*d* may transmit capability information to the base station 105-*b*. The capability information may indicate a capability of the UE 115-*d* to switch between RACH configurations and SR configurations. For example, the UE 115-*d* may indicate whether it is capable of monitoring a PDCCH for an indication of the UE group common RACH configuration or group-common SR configuration. At 410, the base station 105-*b* may transmit control signaling to the UE 115-*d* that indicates a set of RACH configurations or a set of SR configurations. In some examples, the control signaling may include RRC signaling and the set of RACH configurations or the set of SR configurations may include multiple UE-group common configurations corresponding to different power modes of the base station 105-*b*. Additionally or alternatively, the set of RACH configurations or the set of SR configurations may include UE-specific RACH configurations or SR configurations associated with the UE 115-*d*.

In some examples, the base station 105-*b* may transmit the control signaling based on receiving the capability information from the UE 115-*d*, at 405. Based on the indicated capability of the UE 115-*d*, the UE 115-*d* may, at 415, may monitor a control channel, such as a PDCCH for an indication of the UE group common RACH configuration or group-common SR configuration. At 420, the UE 115-*d* may receive, from the base station 105-*b*, an indication of a RACH configuration or an SR configuration from the set of RACH configurations or the set of SR configurations, respectively. The base station 105-*b* may transmit the indication via a DCI or a MAC-CE. The indicated configuration may include a transmission periodicity, a set of time transmission resources, a set of frequency transmission resources, or any combination thereof.

At 425, the UE 115-*d* may select the RACH configuration from the set of RACH configurations or may select the SR configuration from the set of SR configurations and may enable the selected configuration based on receiving the control signaling, the indication, or both. In some examples, the UE 115-*d* may switch from a default RACH or SR configuration to the selected RACH or SR configuration based on receiving the control information, the indication, or both. For example, the UE 115-*d* may switch from a default RACH or SR configuration to a power-savings RACH or SR configuration based on receiving the indication from the base station 105-*b*, or vice versa. In some examples, the default RACH or SR configuration of the UE 115-*d* may correspond to a normal operating mode of the base station 105-*b*.

At 430, the UE 115-*d* may enable a power saving mode if the selected RACH or SR configuration is a power-savings configuration (e.g., a UE-specific power-savings configuration or a UE-group common power-savings configuration). At 435, the UE 115-*d* may perform wireless communications with the base station 105-*b* using the selected configuration. In some examples, the UE 115-*d* may perform the wireless communications with the base station 105-*b* based on switching from a default configuration to the selected configuration. Additionally or alternatively, the UE 115-*d* may perform the wireless communications with the base station 105-*b* based on enabling a power saving mode.

Configuring the UE 115-*d* to perform wireless communications using the selected RACH configuration or SR configuration may result in improved power savings at the base station 105-*b*. For example, the base station 105-*b* may configure the UE 115-*d* with a UE-group RACH configuration or SR configuration that aligns transmission of the UE 115-*d* with transmission of other UEs 115. Aligning these transmission may reduce a number of frames in which the base station 105-*b* is scheduled to receive wireless communications, which may enable the base station 105-*b* to enter a sleep mode for a longer duration (e.g., during a DRX cycle). As a result, the base station 105-*b* may experience greater power savings and improved DRX efficiency, among other benefits.

Figure 5:
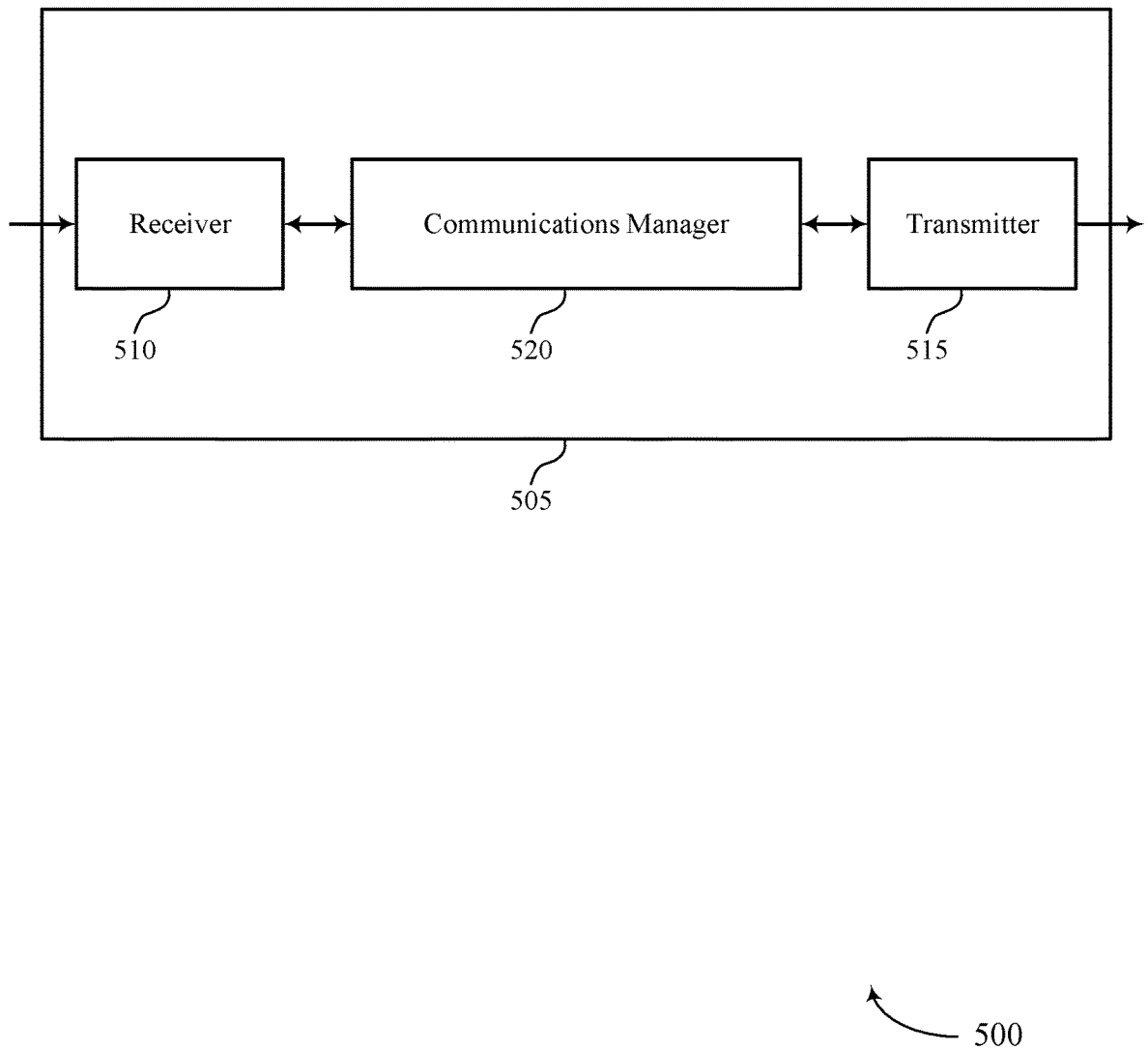
FIGS. 5 and 6 show block diagrams of devices that support techniques for managing discontinuous operation for wireless communication in accordance with aspects of the present disclosure.

FIG. 5 shows a block diagram 500 of a device 505 that supports techniques for managing discontinuous operation for wireless communication in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for managing discontinuous operation for wireless communication). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for managing discontinuous operation for wireless communication). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for managing discontinuous operation for wireless communication as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at the device 505 (e.g., a UE) in accordance with examples as disclosed herein. For example, the communications manager 520 may be configured as or otherwise support a means for receiving, from a base station, control signaling indicating a set of configurations including a set of RACH configurations or a set of SR configurations, where at least one RACH configuration of the set of RACH configurations includes a UE-group common RACH configuration or at least one SR configuration of the set of SR configurations includes a UE-group common SR configuration. The communications manager 520 may be configured as or otherwise support a means for selecting one or more configurations of the set of RACH configurations or the set of SR configurations based on receiving the control signaling. The communications manager 520 may be configured as or otherwise support a means for performing the wireless communication based on the selecting.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced power consumption, more efficient utilization of communication resources, among other examples.

Figure 6:
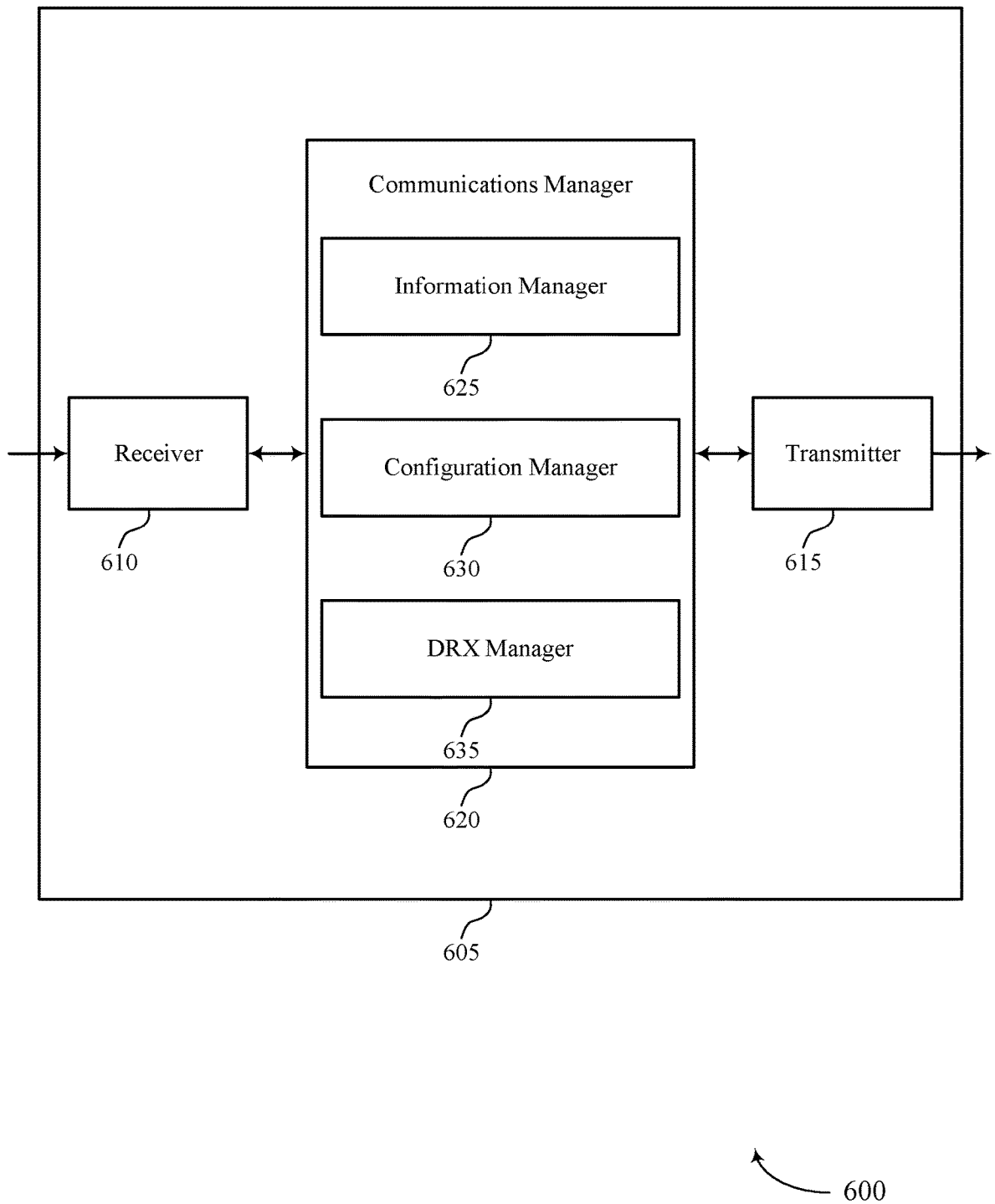

FIG. 6 shows a block diagram 600 of a device 605 that supports techniques for managing discontinuous operation for wireless communication in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for managing discontinuous operation for wireless communication). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for managing discontinuous operation for wireless communication). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for managing discontinuous operation for wireless communication as described herein. For example, the communications manager 620 may include an information manager 625, a configuration manager 630, a DRX manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at the device 605 (e.g., a UE) in accordance with examples as disclosed herein. The information manager 625 may be configured as or otherwise support a means for receiving, from a base station, control signaling indicating a set of configurations including a set of RACH configurations or a set of SR configurations, where at least one RACH configuration of the set of RACH configurations includes a UE-group common RACH configuration or at least one SR configuration of the set of SR configurations includes a UE-group common SR configuration. The configuration manager 630 may be configured as or otherwise support a means for selecting one or more configurations of the set of RACH configurations or the set of SR configurations based on receiving the control signaling. The DRX manager 635 may be configured as or otherwise support a means for performing the wireless communication based on the selecting.

Figure 7:
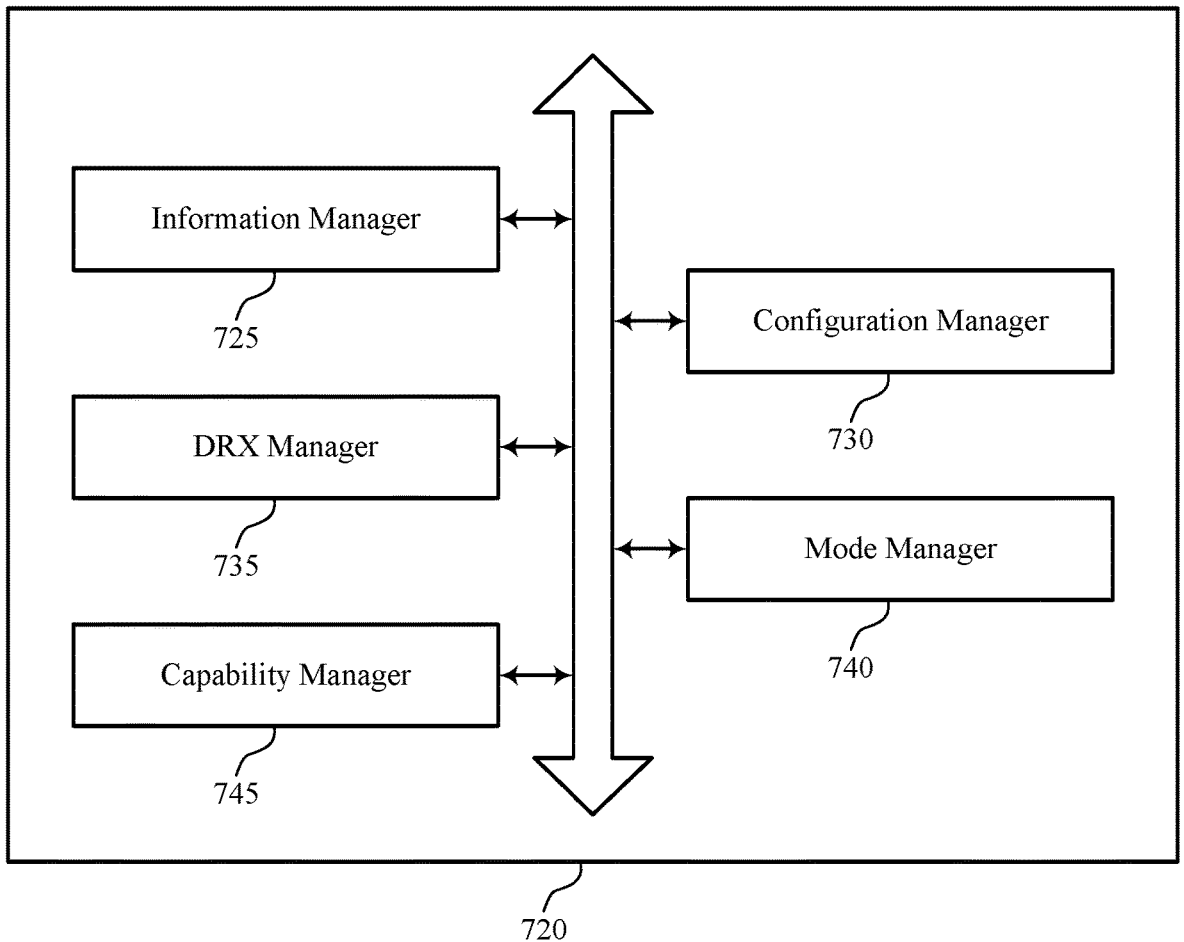
FIG. 7 shows a block diagram of a communications manager that supports techniques for managing discontinuous operation for wireless communication in accordance with aspects of the present disclosure.

FIG. 7 shows a block diagram 700 of a communications manager 720 that supports techniques for managing discontinuous operation for wireless communication in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for managing discontinuous operation for wireless communication as described herein. For example, the communications manager 720 may include an information manager 725, a configuration manager 730, a DRX manager 735, a mode manager 740, a capability manager 745, or any combination thereof. Each of these components may communicate, directly or indirectly, with one another (e.g., via one or more buses).

The communications manager 720 may support wireless communication at a UE in accordance with examples as disclosed herein. The information manager 725 may be configured as or otherwise support a means for receiving, from a base station, control signaling indicating a set of configurations including a set of RACH configurations or a set of SR configurations, where at least one RACH configuration of the set of RACH configurations includes a UE-group common RACH configuration or at least one SR configuration of the set of SR configurations includes a UE-group common SR configuration. The configuration manager 730 may be configured as or otherwise support a means for selecting one or more configurations of the set of RACH configurations or the set of SR configurations based on receiving the control signaling. The DRX manager 735 may be configured as or otherwise support a means for performing the wireless communication based on the selecting.

In some examples, the mode manager 740 may be configured as or otherwise support a means for enabling a power saving mode based on selecting the one or more configurations, where performing the wireless communication is based on enabling the power saving mode. In some examples, the configuration manager 730 may be configured as or otherwise support a means for selecting a UE-specific RACH configuration based on receiving an indication. In some examples, the configuration manager 730 may be configured as or otherwise support a means for switching from a baseline UE-specific RACH configuration to the selected UE-specific RACH configuration. In some examples, performing the wireless communication is based on the switching.

In some examples, the configuration manager 730 may be configured as or otherwise support a means for selecting the UE-group common RACH configuration based on receiving an indication. In some examples, the configuration manager 730 may be configured as or otherwise support a means for switching from a baseline UE-group common RACH configuration to the selected UE-group common RACH configuration. In some examples, performing the wireless communication is based on the switching. In some examples, the configuration manager 730 may be configured as or otherwise support a means for selecting a UE-specific SR configuration based on receiving an indication. In some examples, the configuration manager 730 may be configured as or otherwise support a means for switching from a baseline UE-specific SR configuration to the selected UE-specific SR configuration. In some examples, performing the wireless communication is based on the switching. In some examples, the configuration manager 730 may be configured as or otherwise support a means for selecting the UE-group common SR configuration based on receiving an indication. In some examples, the configuration manager 730 may be configured as or otherwise support a means for switching from a baseline UE-group SR configuration to the selected UE-group common SR configuration. In some examples, performing the wireless communication is based on the switching.

In some examples, to support receiving the control signaling, the information manager 725 may be configured as or otherwise support a means for receiving an RRC message indicating the set of configurations including one or more of the set of RACH configurations or the set of SR configurations. In some examples, the capability manager 750 may be configured as or otherwise support a means for transmitting information associated with a capability of the UE to select between different RACH configurations or different SR configurations. In some examples, receiving the control signaling is based on transmitting the information. In some examples, the information manager 725 may be configured as or otherwise support a means for receiving an indication of one or more RACH configurations of the set of RACH configurations or one or more SR configurations of the set of SR configurations. In some examples, selecting the one or more configurations is based on receiving the indication.

In some examples, to support receiving the indication, the information manager 725 may be configured as or otherwise support a means for receiving DCI that includes the indication. In some examples, selecting the one or more configurations is based on receiving the DCI. In some examples, the DCI includes a UE-specific DCI format. In some examples, the UE-specific DCI format is based on the DCI scheduling one or more of a PUSCH or a PDSCH. In some examples, the DCI includes a UE-group DCI format. In some examples, the information manager 725 may be configured as or otherwise support a means for monitoring a PDCCH based on a capability of the UE. In some examples, receiving the indication is based on monitoring the PDCCH.

In some examples, to support receiving the indication, the information manager 725 may be configured as or otherwise support a means for receiving a MAC-CE that includes the indication. In some examples, selecting the one or more configurations is based on receiving the MAC-CE. In some examples, the one or more configurations correspond to a separate power mode different than a baseline power mode associated with one or more of a baseline configuration. In some examples, the set of RACH configurations includes one or more UE-specific RACH configurations and one or more UE-group common RACH configurations. In some examples, the set of SR configurations includes one or more UE-specific SR configurations and one or more UE-group common SR configurations.

Figure 8:
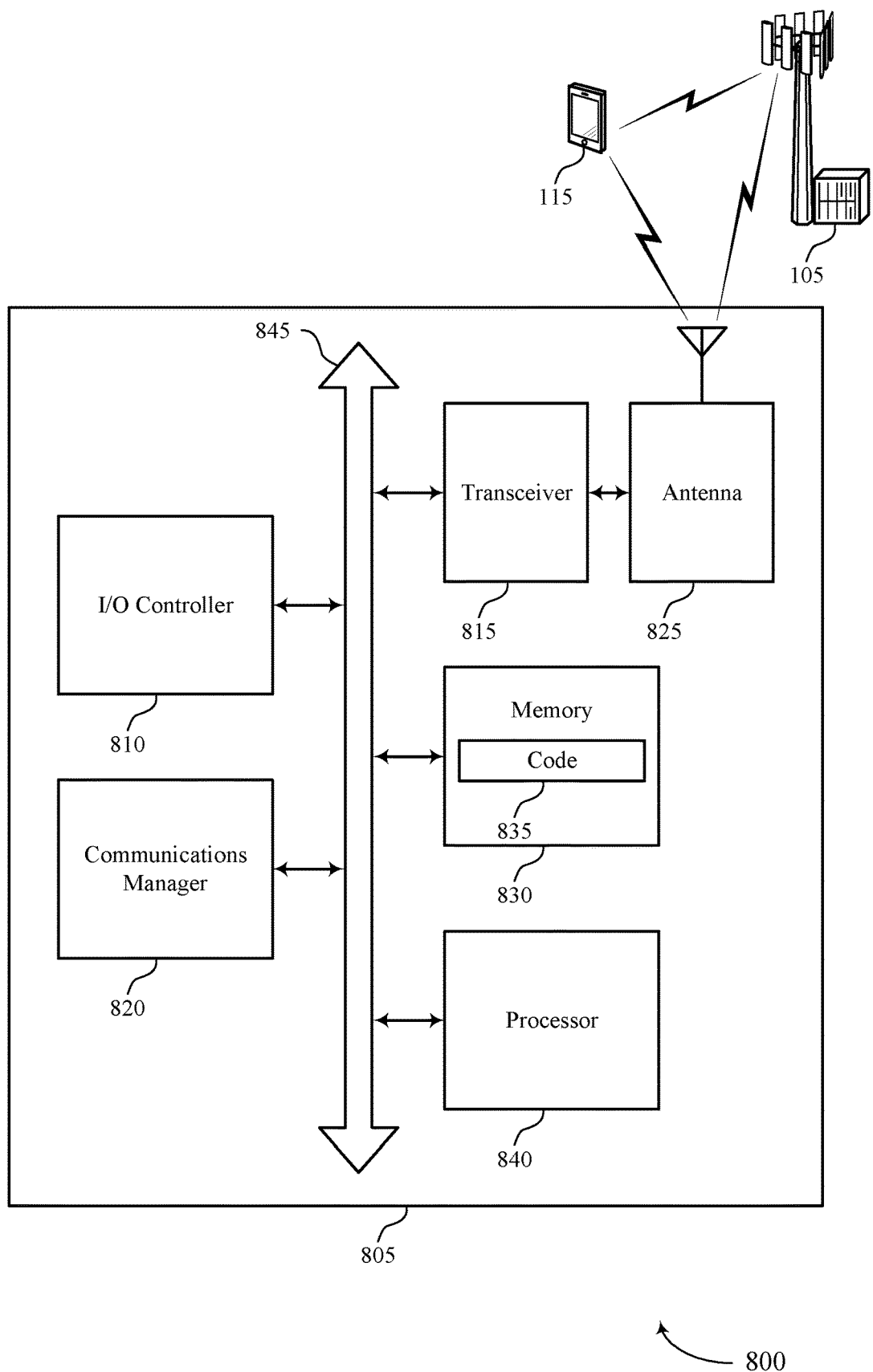
FIG. 8 shows a diagram of a system including a device that supports techniques for managing discontinuous operation for wireless communication in accordance with aspects of the present disclosure.

FIG. 8 shows a diagram of a system 800 including a device 805 that supports techniques for managing discontinuous operation for wireless communication in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for managing discontinuous operation for wireless communication). For example, the device 805 or a component of the device 805 may include a processor 840 and memory 830 coupled to the processor 840, the processor 840 and memory 830 configured to perform various functions described herein.

The communications manager 820 may support wireless communication at the device 805 (e.g., a UE) in accordance with examples as disclosed herein. For example, the communications manager 820 may be configured as or otherwise support a means for receiving, from a base station, control signaling indicating a set of configurations including a set of RACH configurations or a set of SR configurations, where at least one RACH configuration of the set of RACH configurations includes a UE-group common RACH configuration or at least one SR configuration of the set of SR configurations includes a UE-group common SR configuration. The communications manager 820 may be configured as or otherwise support a means for selecting one or more configurations of the set of RACH configurations or the set of SR configurations based on receiving the control signaling. The communications manager 820 may be configured as or otherwise support a means for performing the wireless communication based on the selecting. By including or configuring the communications manager 820 in accordance with examples as described herein, the device 805 may support techniques for reduced power consumption, more efficient utilization of communication resources, improved coordination between devices, improved utilization of processing capability, among other examples.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for managing discontinuous operation for wireless communication as described herein, or the processor 840 and the memory 830 may be otherwise configured to perform or support such operations.

Figure 9:
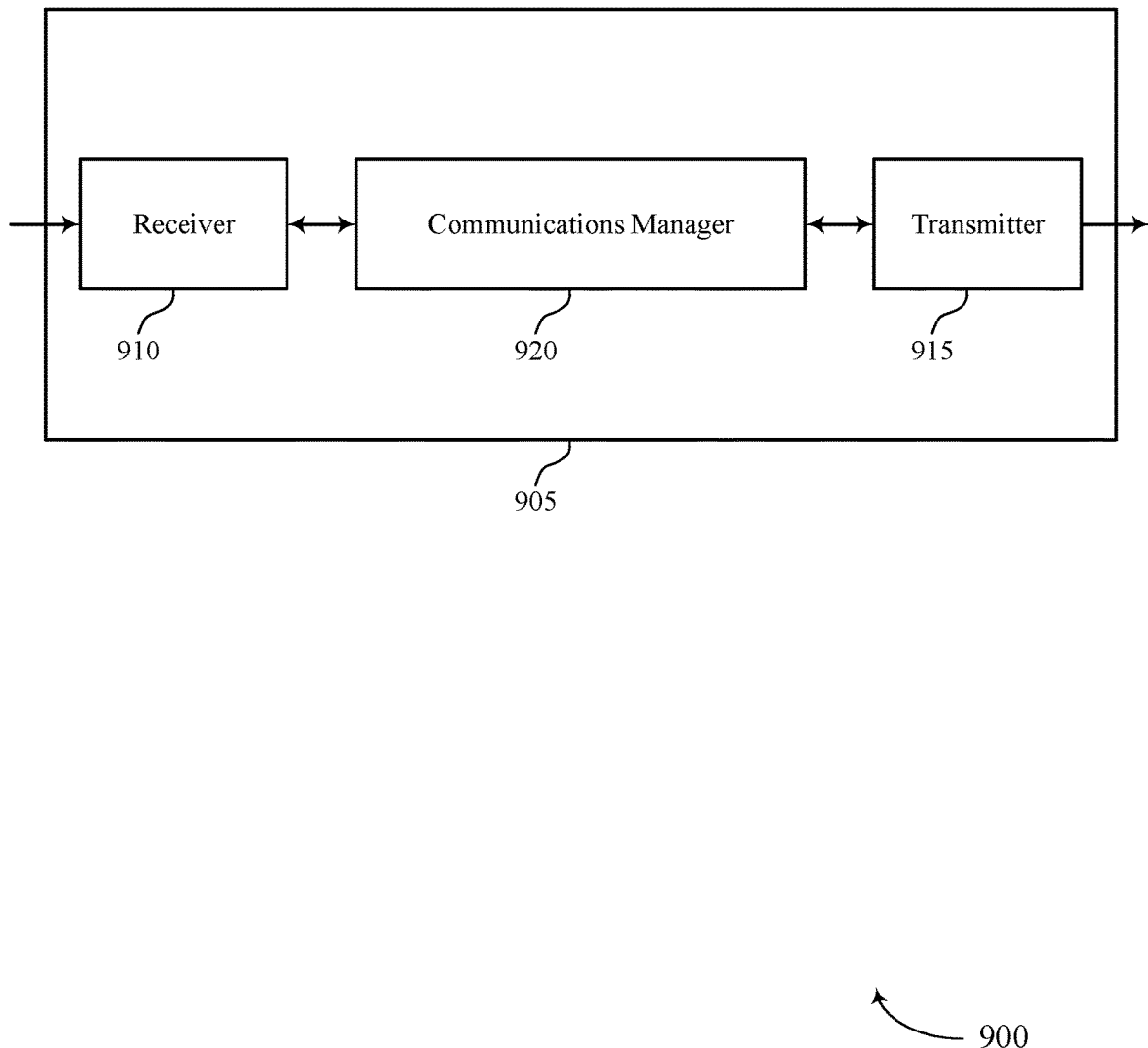
FIGS. 9 and 10 show block diagrams of devices that support techniques for managing discontinuous operation for wireless communication in accordance with aspects of the present disclosure.

FIG. 9 shows a block diagram 900 of a device 905 that supports techniques for managing discontinuous operation for wireless communication in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for managing discontinuous operation for wireless communication). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for managing discontinuous operation for wireless communication). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for managing discontinuous operation for wireless communication as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at the device 905 (e.g., a base station) in accordance with examples as disclosed herein. For example, the communications manager 920 may be configured as or otherwise support a means for transmitting, to a UE, control signaling indicating a set of configurations including a set of RACH configurations or a set of SR configurations, where at least one RACH configuration of the set of RACH configurations includes a UE-group common RACH configuration or at least one SR configuration of the set of SR configurations includes a UE-group common SR configuration. The communications manager 920 may be configured as or otherwise support a means for selecting one or more configurations of the set of RACH configurations or the set of SR configurations based on transmitting the control signaling. The communications manager 920 may be configured as or otherwise support a means for performing the wireless communication based on the selecting.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced power consumption, more efficient utilization of communication resources, among other examples.

Figure 10:
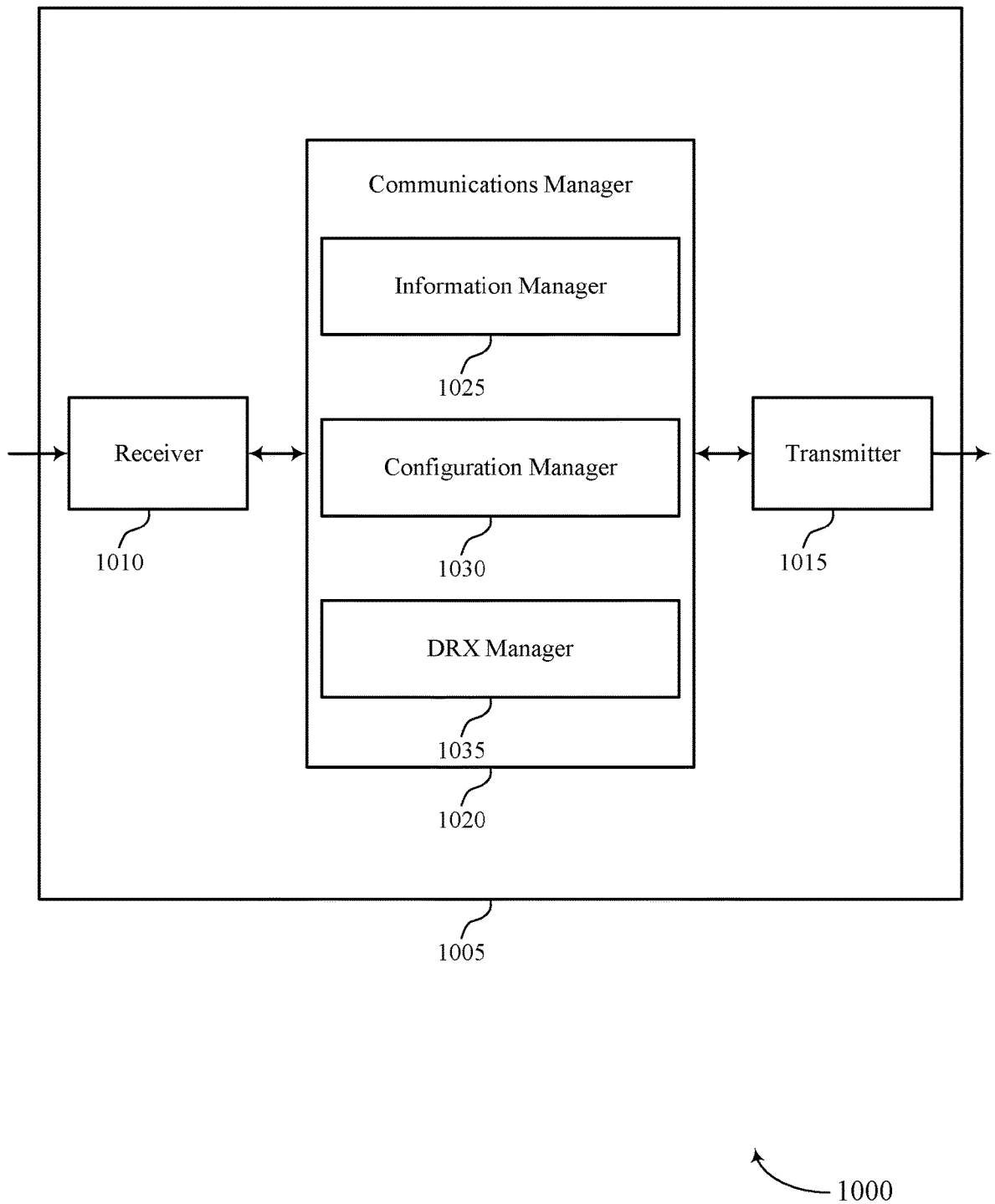

FIG. 10 shows a block diagram 1000 of a device 1005 that supports techniques for managing discontinuous operation for wireless communication in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for managing discontinuous operation for wireless communication). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for managing discontinuous operation for wireless communication). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for managing discontinuous operation for wireless communication as described herein. For example, the communications manager 1020 may include an information manager 1025, a configuration manager 1030, a DRX manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at the device 1005 (e.g., a base station) in accordance with examples as disclosed herein. The information manager 1025 may be configured as or otherwise support a means for transmitting, to a UE, control signaling indicating a set of configurations including a set of RACH configurations or a set of SR configurations, where at least one RACH configuration of the set of RACH configurations includes a UE-group common RACH configuration or at least one SR configuration of the set of SR configurations includes a UE-group common SR configuration. The configuration manager 1030 may be configured as or otherwise support a means for selecting one or more configurations of the set of RACH configurations or the set of SR configurations based on transmitting the control signaling. The DRX manager 1035 may be configured as or otherwise support a means for performing the wireless communication based on the selecting.

Figure 11:
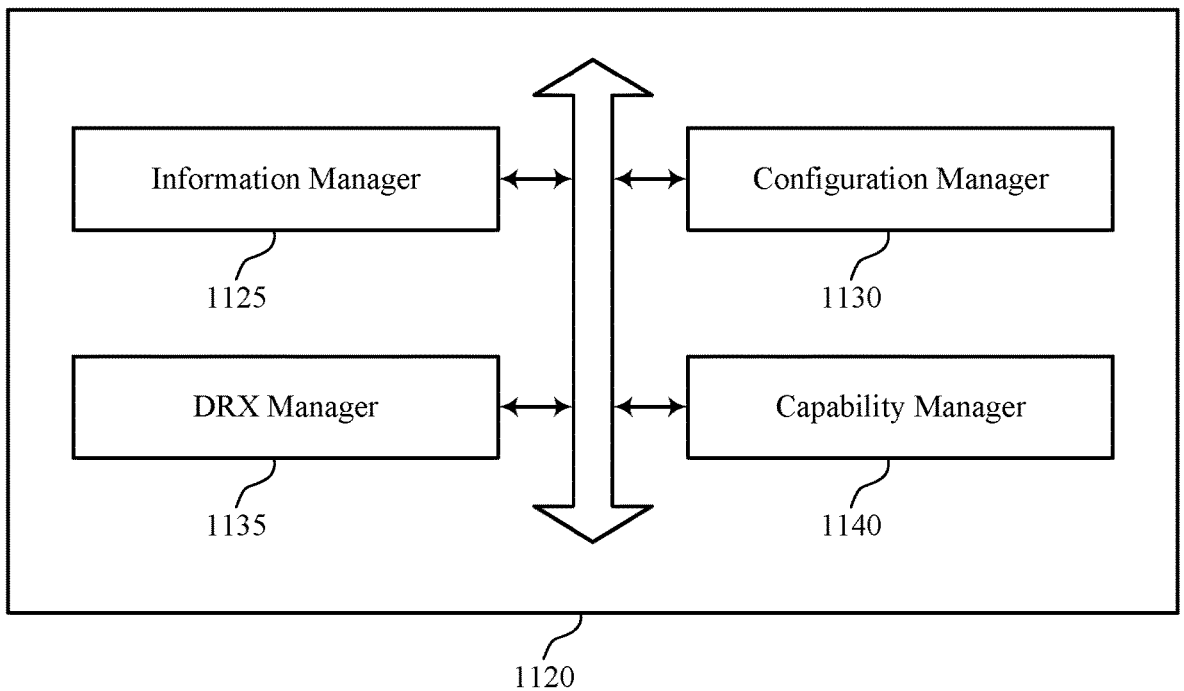
FIG. 11 shows a block diagram of a communications manager that supports techniques for managing discontinuous operation for wireless communication in accordance with aspects of the present disclosure.

FIG. 11 shows a block diagram 1100 of a communications manager 1120 that supports techniques for managing discontinuous operation for wireless communication in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for managing discontinuous operation for wireless communication as described herein. For example, the communications manager 1120 may include an information manager 1125, a configuration manager 1130, a DRX manager 1135, a capability manager 1140, or any combination thereof. Each of these components may communicate, directly or indirectly, with one another (e.g., via one or more buses).

The communications manager 1120 may support wireless communication at a base station in accordance with examples as disclosed herein. The information manager 1125 may be configured as or otherwise support a means for transmitting, to a UE, control signaling indicating a set of configurations including a set of RACH configurations or a set of SR configurations, where at least one RACH configuration of the set of RACH configurations includes a UE-group common RACH configuration or at least one SR configuration of the set of SR configurations includes a UE-group common SR configuration. The configuration manager 1130 may be configured as or otherwise support a means for selecting one or more configurations of the set of RACH configurations or the set of SR configurations based on transmitting the control signaling. The DRX manager 1135 may be configured as or otherwise support a means for performing the wireless communication based on the selecting.

In some examples, to support transmitting the control signaling, the information manager 1125 may be configured as or otherwise support a means for transmitting an RRC message indicating the set of configurations including one or more of the set of RACH configurations or the set of SR configurations. In some examples, the capability manager 1140 may be configured as or otherwise support a means for receiving information associated with a capability of the UE to select between different RACH configurations or different SR configurations. In some examples, transmitting the control signaling is based on receiving the information.

In some examples, the configuration manager 1130 may be configured as or otherwise support a means for transmitting an indication of one or more RACH configurations of the set of RACH configurations or one or more SR configurations of the set of SR configurations. In some examples, selecting the one or more configurations is based on transmitting the indication. In some examples, to support transmitting the indication, the information manager 1125 may be configured as or otherwise support a means for transmitting DCI that includes the indication. In some examples, to support transmitting the indication, the configuration manager 1130 may be configured as or otherwise support a means for selecting the one or more configurations based on transmitting the DCI. In some examples, the DCI includes a UE-specific DCI format. In some examples, the UE-specific DCI format is based on the DCI scheduling one or more of a PUSCH or a PDSCH. In some examples, the DCI includes a UE-group DCI format. In some examples, to support transmitting the indication, the information manager 1125 may be configured as or otherwise support a means for transmitting a MAC-CE that includes the indication. In some examples, to support transmitting the indication, the configuration manager 1130 may be configured as or otherwise support a means for selecting the one or more configurations based on transmitting the MAC-CE.

In some examples, the one or more configurations correspond to a separate power mode different than a baseline power mode associated with one or more of a baseline configuration. In some examples, the DRX manager 1135 may be configured as or otherwise support a means for enabling a power saving mode based on selecting the one or more configurations. In some examples, performing the wireless communication is based on enabling the power saving mode. In some examples, the set of RACH configurations includes one or more UE-specific RACH configurations and one or more UE-group common RACH configurations. In some examples, the set of SR configurations includes one or more UE-specific SR configurations and one or more UE-group common SR configurations.

Figure 12:
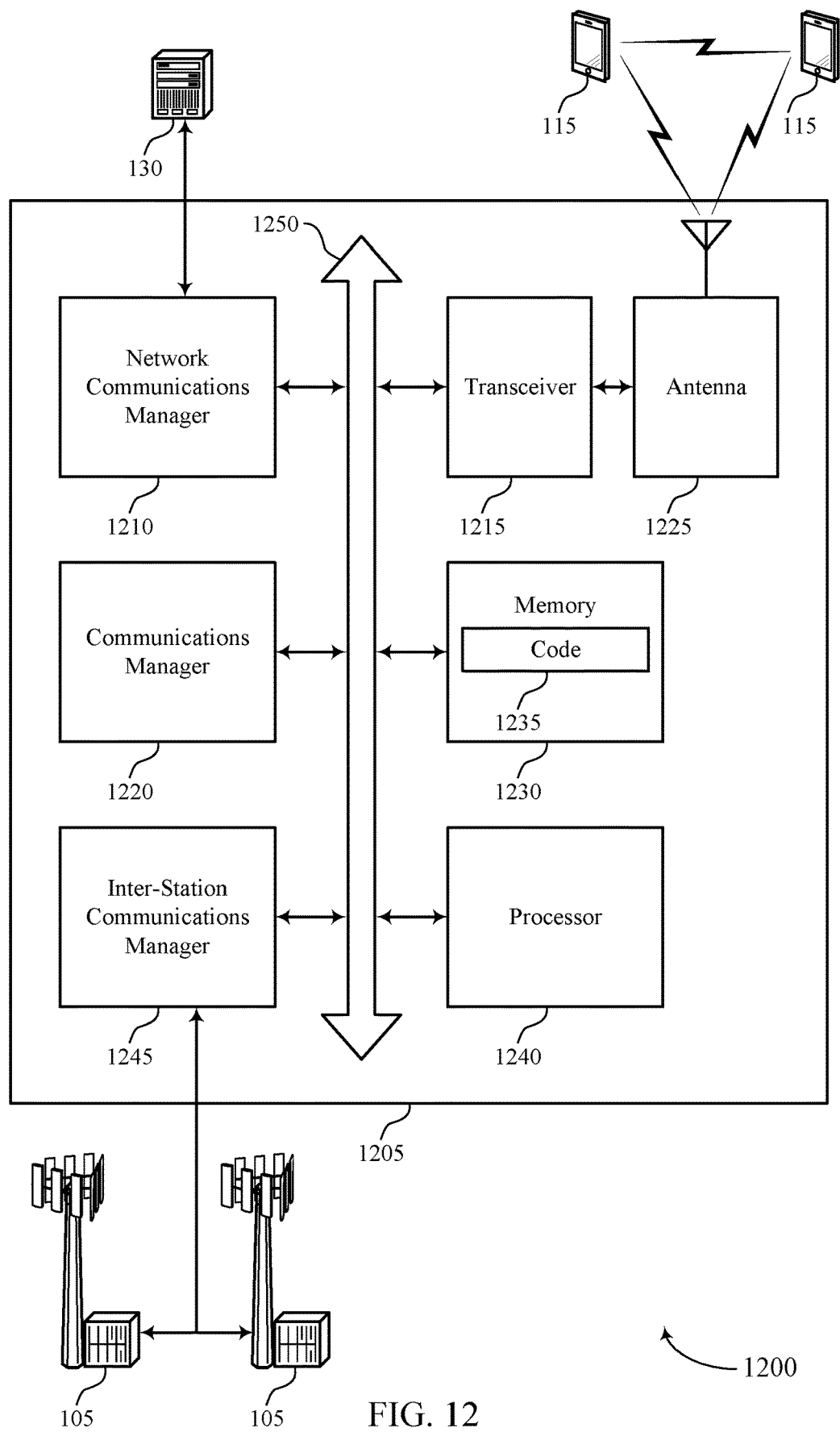
FIG. 12 shows a diagram of a system including a device that supports techniques for managing discontinuous operation for wireless communication in accordance with aspects of the present disclosure.

FIG. 12 shows a diagram of a system 1200 including a device 1205 that supports techniques for managing discontinuous operation for wireless communication in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for managing discontinuous operation for wireless communication). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at the device 1205 (e.g., a base station) in accordance with examples as disclosed herein. For example, the communications manager 1220 may be configured as or otherwise support a means for transmitting, to a UE, control signaling indicating a set of configurations including a set of RACH configurations or a set of SR configurations, where at least one RACH configuration of the set of RACH configurations includes a UE-group common RACH configuration or at least one SR configuration of the set of SR configurations includes a UE-group common SR configuration. The communications manager 1220 may be configured as or otherwise support a means for selecting one or more configurations of the set of RACH configurations or the set of SR configurations based on transmitting the control signaling. The communications manager 1220 may be configured as or otherwise support a means for performing the wireless communication based on the selecting.

By including or configuring the communications manager 1220 in accordance with examples as described herein, the device 1205 may support techniques for reduced power consumption, more efficient utilization of communication resources, improved coordination between devices, longer battery life, improved utilization of processing capability, among other examples.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for managing discontinuous operation for wireless communication as described herein, or the processor 1240 and the memory 1230 may be otherwise configured to perform or support such operations.

Figure 13:
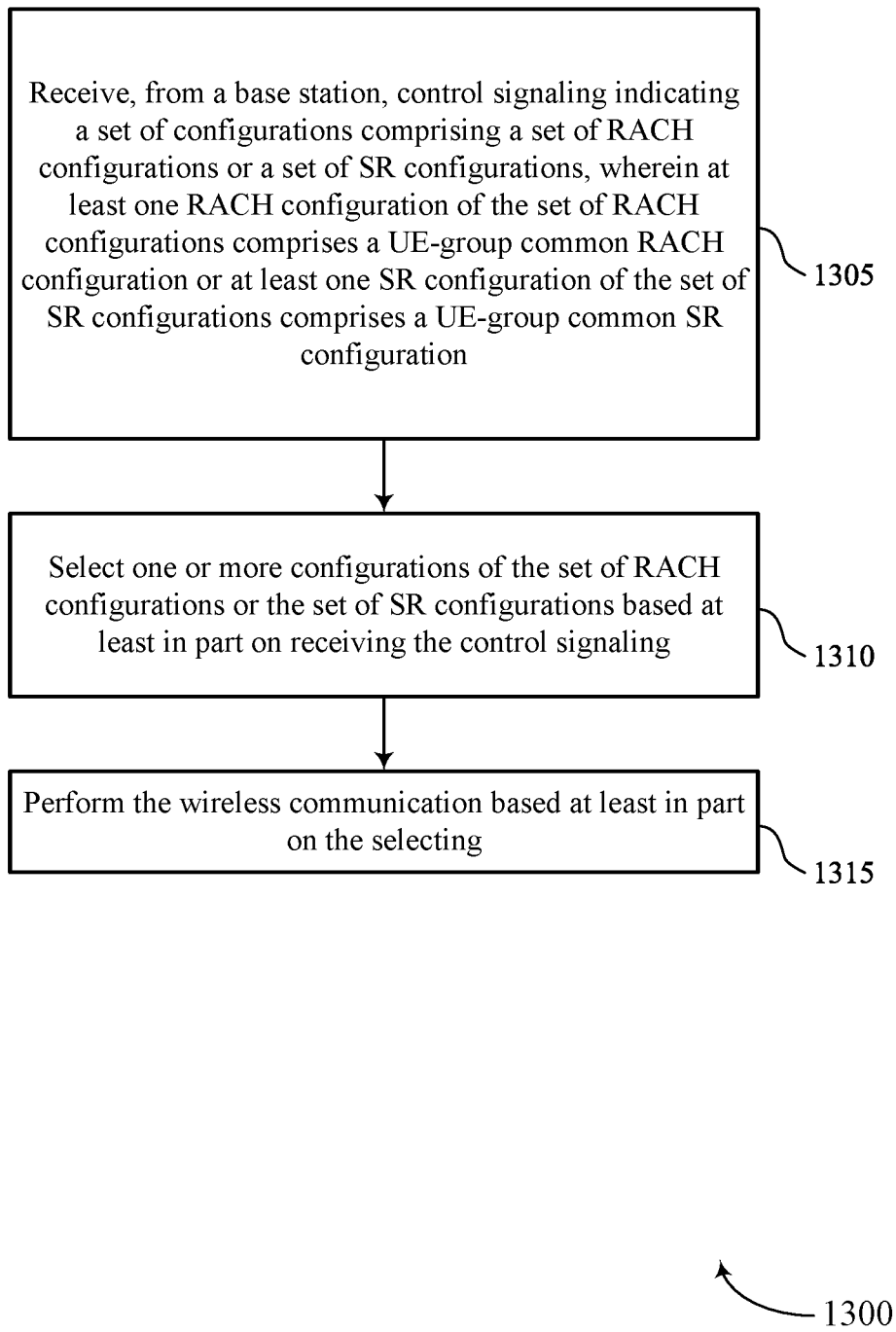
FIGS. 13 through 16 show flowcharts illustrating methods that support techniques for managing discontinuous operation for wireless communication in accordance with aspects of the present disclosure.

FIG. 13 shows a flowchart illustrating a method 1300 that supports techniques for managing discontinuous operation for wireless communication in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, control signaling indicating a set of configurations including a set of RACH configurations or a set of SR configurations, where at least one RACH configuration of the set of RACH configurations includes a UE-group common RACH configuration or at least one SR configuration of the set of SR configurations includes a UE-group common SR configuration. The operations of 1305 may be performed in accordance with examples as disclosed herein. In some examples, aspects of the operations of 1305 may be performed by an information manager 725 as described with reference to FIG. 7.

At 1310, the method may include selecting one or more configurations of the set of RACH configurations or the set of SR configurations based on receiving the control signaling. The operations of 1310 may be performed in accordance with examples as disclosed herein. In some examples, aspects of the operations of 1310 may be performed by a configuration manager 730 as described with reference to FIG. 7.

At 1315, the method may include performing the wireless communication based on the selecting. The operations of 1315 may be performed in accordance with examples as disclosed herein. In some examples, aspects of the operations of 1315 may be performed by a DRX manager 735 as described with reference to FIG. 7.

Figure 14:
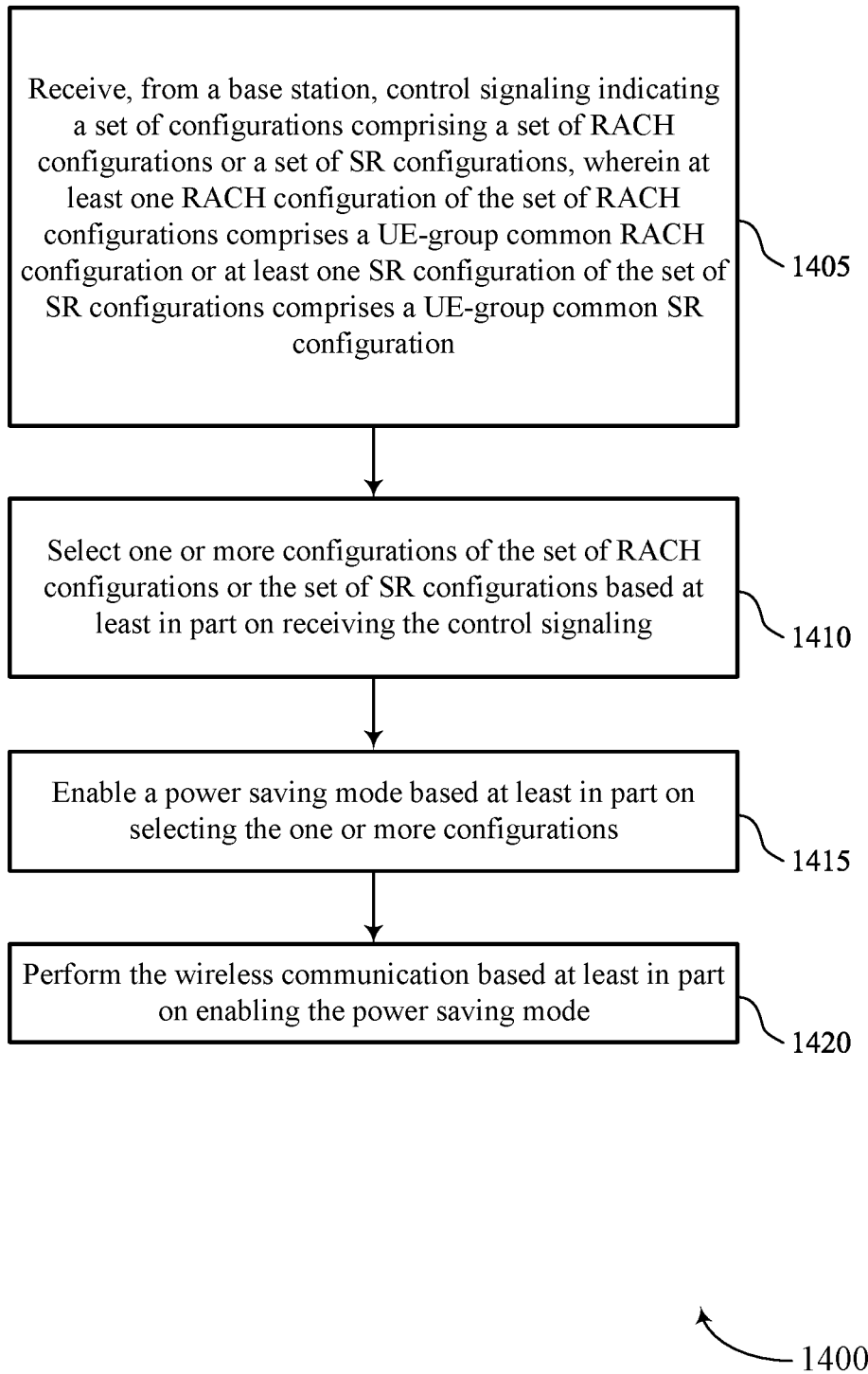

FIG. 14 shows a flowchart illustrating a method 1400 that supports techniques for managing discontinuous operation for wireless communication in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, control signaling indicating a set of configurations including a set of RACH configurations or a set of SR configurations, where at least one RACH configuration of the set of RACH configurations includes a UE-group common RACH configuration or at least one SR configuration of the set of SR configurations includes a UE-group common SR configuration. The operations of 1405 may be performed in accordance with examples as disclosed herein. In some examples, aspects of the operations of 1405 may be performed by an information manager 725 as described with reference to FIG. 7.

At 1410, the method may include selecting one or more configurations of the set of RACH configurations or the set of SR configurations based on receiving the control signaling. The operations of 1410 may be performed in accordance with examples as disclosed herein. In some examples, aspects of the operations of 1410 may be performed by a configuration manager 730 as described with reference to FIG. 7.

At 1415, the method may include enabling a power saving mode based on selecting the one or more configurations. The operations of 1415 may be performed in accordance with examples as disclosed herein. In some examples, aspects of the operations of 1415 may be performed by a mode manager 740 as described with reference to FIG. 7.

At 1420, the method may include performing the wireless communication based on enabling the power saving mode. The operations of 1420 may be performed in accordance with examples as disclosed herein. In some examples, aspects of the operations of 1420 may be performed by a DRX manager 735 as described with reference to FIG. 7.

Figure 15:
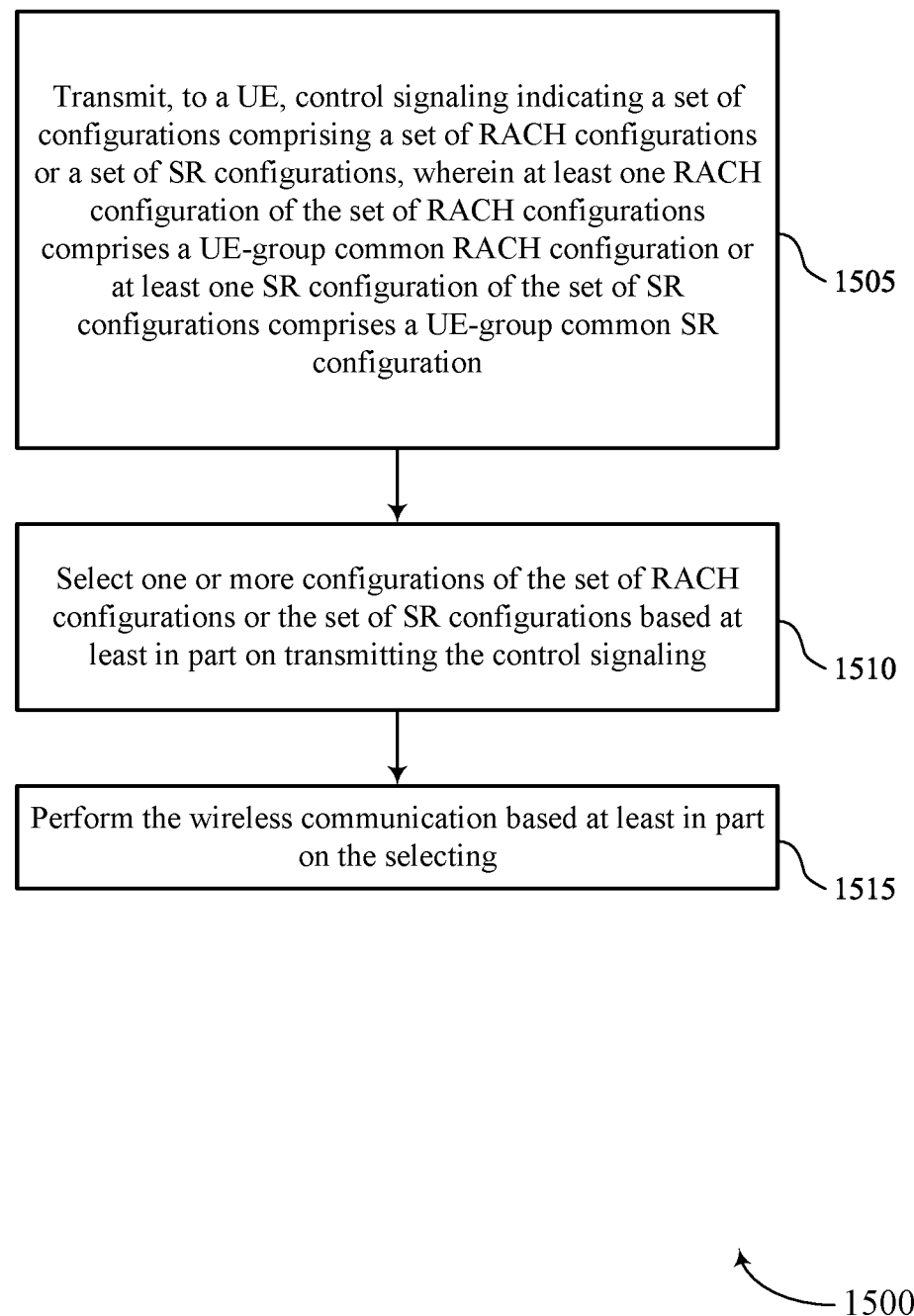

FIG. 15 shows a flowchart illustrating a method 1500 that supports techniques for managing discontinuous operation for wireless communication in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, control signaling indicating a set of configurations including a set of RACH configurations or a set of SR configurations, where at least one RACH configuration of the set of RACH configurations includes a UE-group common RACH configuration or at least one SR configuration of the set of SR configurations includes a UE-group common SR configuration. The operations of 1505 may be performed in accordance with examples as disclosed herein. In some examples, aspects of the operations of 1505 may be performed by an information manager 1125 as described with reference to FIG. 11.

At 1510, the method may include selecting one or more configurations of the set of RACH configurations or the set of SR configurations based on transmitting the control signaling. The operations of 1510 may be performed in accordance with examples as disclosed herein. In some examples, aspects of the operations of 1510 may be performed by a configuration manager 1130 as described with reference to FIG. 11.

At 1515, the method may include performing the wireless communication based on the selecting. The operations of 1515 may be performed in accordance with examples as disclosed herein. In some examples, aspects of the operations of 1515 may be performed by a DRX manager 1135 as described with reference to FIG. 11.

Figure 16:
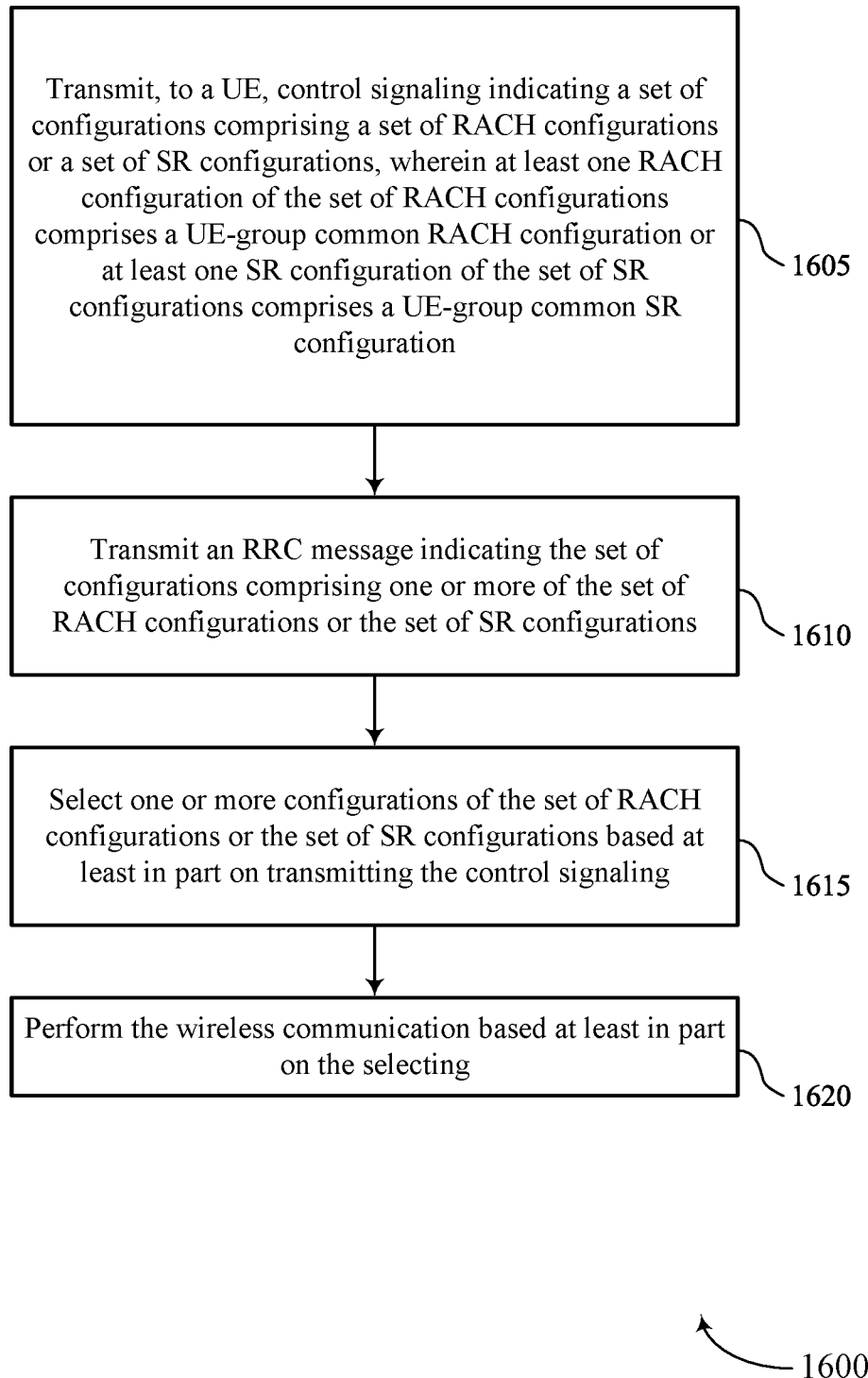

FIG. 16 shows a flowchart illustrating a method 1600 that supports techniques for managing discontinuous operation for wireless communication in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, control signaling indicating a set of configurations including a set of RACH configurations or a set of SR configurations, where at least one RACH configuration of the set of RACH configurations includes a UE-group common RACH configuration or at least one SR configuration of the set of SR configurations includes a UE-group common SR configuration. The operations of 1605 may be performed in accordance with examples as disclosed herein. In some examples, aspects of the operations of 1605 may be performed by an information manager 1125 as described with reference to FIG. 11.

At 1610, the method may include transmitting an RRC message indicating the set of configurations including one or more of the set of RACH configurations or the set of SR configurations. The operations of 1610 may be performed in accordance with examples as disclosed herein. In some examples, aspects of the operations of 1610 may be performed by an information manager 1125 as described with reference to FIG. 11.

At 1615, the method may include selecting one or more configurations of the set of RACH configurations or the set of SR configurations based on transmitting the control signaling. The operations of 1615 may be performed in accordance with examples as disclosed herein. In some examples, aspects of the operations of 1615 may be performed by a configuration manager 1130 as described with reference to FIG. 11.

At 1620, the method may include performing the wireless communication based on the selecting. The operations of 1620 may be performed in accordance with examples as disclosed herein. In some examples, aspects of the operations of 1620 may be performed by a DRX manager 1135 as described with reference to FIG. 11.

The following provides an overview of aspects of the present disclosure:

Aspect 1: A method for wireless communication at a UE, comprising: receiving, from a base station, control signaling indicating a set of configurations comprising a set of RACH configurations or a set of SR configurations, wherein at least one RACH configuration of the set of RACH configurations comprises a UE-group common RACH configuration or at least one SR configuration of the set of SR configurations comprises a UE-group common SR configuration; selecting one or more configurations of the set of RACH configurations or the set of SR configurations based at least in part on receiving the control signaling; and performing the wireless communication based at least in part on the selecting.

Aspect 2: The method of aspect 1, further comprising: enabling a power saving mode based at least in part on selecting the one or more configurations, wherein performing the wireless communication is based at least in part on enabling the power saving mode.

Aspect 3: The method of any of aspects 1 through 2, further comprising: selecting a UE-specific RACH configuration based at least in part on receiving an indication; and switching from a baseline UE-specific RACH configuration to the selected UE-specific RACH configuration, wherein performing the wireless communication is based at least in part on the switching.

Aspect 4: The method of any of aspects 1 through 2, further comprising: selecting the UE-group common RACH configuration based at least in part on receiving an indication; and switching from a baseline UE-group common RACH configuration to the selected UE-group common RACH configuration, wherein performing the wireless communication is based at least in part on the switching.

Aspect 5: The method of any of aspects 1 through 2, further comprising: selecting a UE-specific SR configuration based at least in part on receiving an indication; and switching from a baseline UE-specific SR configuration to the selected UE-specific SR configuration, wherein performing the wireless communication is based at least in part on the switching.

Aspect 6: The method of any of aspects 1 through 2, further comprising: selecting the UE-group common SR configuration based at least in part on receiving an indication; and switching from a baseline UE-group common SR configuration to the selected UE-group common SR configuration, wherein performing the wireless communication is based at least in part on the switching.

Aspect 7: The method of any of aspects 1 through 6, wherein receiving the control signaling comprises: receiving an RRC message indicating the set of configurations comprising one or more of the set of RACH configurations or the set of SR configurations.

Aspect 8: The method of any of aspects 1 through 7, further comprising: transmitting information associated with a capability of the UE to select between different RACH configurations or different SR configurations, wherein receiving the control signaling is based at least in part on transmitting the information.

Aspect 9: The method of any of aspects 1 through 8, further comprising: receiving an indication of one or more RACH configurations of the set of RACH configurations or one or more SR configurations of the set of SR configurations, wherein selecting the one or more configurations is based at least in part on receiving the indication.

Aspect 10: The method of aspect 9, wherein receiving the indication comprises: receiving DCI that includes the indication, wherein selecting the one or more configurations is based at least in part on receiving the DCI.

Aspect 11: The method of aspect 10, wherein the DCI comprises a UE-specific DCI format; and the UE-specific DCI format is based at least in part on the DCI scheduling one or more of a physical uplink shared channel or a physical downlink shared channel.

Aspect 12: The method of any of aspects 10 through 11, wherein the DCI comprises a UE-group DCI format.

Aspect 13: The method of any of aspects 9 through 12, further comprising: monitoring a physical downlink control channel based at least in part on a capability of the UE, wherein receiving the indication is based at least in part on monitoring the physical downlink control channel.

Aspect 14: The method of any of aspects 9 through 13, wherein receiving the indication comprises: receiving a MAC-CE that includes the indication, wherein selecting the one or more configurations is based at least in part on receiving the MAC-CE.

Aspect 15: The method of any of aspects 1 through 14, wherein the one or more configurations correspond to a separate power mode different than a baseline power mode associated with one or more of a baseline configuration.

Aspect 16: The method of any of aspects 1 through 15, wherein the set of RACH configurations comprises one or more UE-specific RACH configurations and one or more UE-group common RACH configurations; and the set of SR configurations comprises one or more UE-specific SR configurations and one or more UE-group common SR configurations.

Aspect 17: A method for wireless communication at a base station, comprising: transmitting, to a UE, control signaling indicating a set of configurations comprising a set of RACH configurations or a set of SR configurations, wherein at least one RACH configuration of the set of RACH configurations comprises a UE-group common RACH configuration or at least one SR configuration of the set of SR configurations comprises a UE-group common SR configuration; selecting one or more configurations of the set of RACH configurations or the set of SR configurations based at least in part on transmitting the control signaling; and performing the wireless communication based at least in part on the selecting.

Aspect 18: The method of aspect 17, wherein transmitting the control signaling comprises: transmitting an RRC message indicating the set of configurations comprising one or more of the set of RACH configurations or the set of SR configurations.

Aspect 19: The method of any of aspects 17 through 18, further comprising: receiving information associated with a capability of the UE to select between different RACH configurations or different SR configurations, wherein transmitting the control signaling is based at least in part on receiving the information.

Aspect 20: The method of any of aspects 17 through 19, further comprising: transmitting an indication of one or more RACH configurations of the set of RACH configurations or one or more SR configurations of the set of SR configurations, wherein selecting the one or more configurations is based at least in part on transmitting the indication.

Aspect 21: The method of aspect 20, wherein transmitting the indication comprises: transmitting DCI that includes the indication, wherein selecting the one or more configurations is based at least in part on transmitting the DCI.

Aspect 22: The method of aspect 21, wherein the DCI comprises a UE-specific DCI format; and the UE-specific DCI format is based at least in part on the DCI scheduling one or more of a physical uplink shared channel or a physical downlink shared channel.

Aspect 23: The method of any of aspects 21 through 22, wherein the DCI comprises a UE-group DCI format.

Aspect 24: The method of any of aspects 20 through 23, wherein transmitting the indication comprises: transmitting a MAC-CE that includes the indication, wherein selecting the one or more configurations is based at least in part on transmitting the MAC-CE.

Aspect 25: The method of any of aspects 17 through 24, wherein the one or more configurations correspond to a separate power mode different than a baseline power mode associated with one or more of a baseline configuration.

Aspect 26: The method of any of aspects 17 through 25, further comprising: enabling a power saving mode based at least in part on selecting the one or more configurations, wherein performing the wireless communication is based at least in part on enabling the power saving mode.

Aspect 27: The method of any of aspects 17 through 26, wherein the set of RACH configurations comprises one or more UE-specific RACH configurations and one or more UE-group common RACH configurations.

Aspect 28: The method of any of aspects 17 through 27, wherein the set of SR configurations comprises one or more UE-specific SR configurations and one or more UE-group common SR configurations.

Aspect 29: An apparatus for wireless communication at a UE, comprising a processor; memory coupled with the processor; and instructions stored in the memory and executable by the processor to cause the apparatus to perform a method of any of aspects 1 through 16.

Aspect 30: An apparatus for wireless communication at a UE, comprising at least one means for performing a method of any of aspects 1 through 16.

Aspect 31: A non-transitory computer-readable medium storing code for wireless communication at a UE, the code comprising instructions executable by a processor to perform a method of any of aspects 1 through 16.

Aspect 32: An apparatus for wireless communication at a base station, comprising a processor; memory coupled with the processor; and instructions stored in the memory and executable by the processor to cause the apparatus to perform a method of any of aspects 17 through 28.

Aspect 33: An apparatus for wireless communication at a base station, comprising at least one means for performing a method of any of aspects 17 through 28.

Aspect 34: A non-transitory computer-readable medium storing code for wireless communication at a base station, the code comprising instructions executable by a processor to perform a method of any of aspects 17 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a network entity, control signaling indicating a set of configurations comprising a set of random access channel configurations or a set of scheduling request configurations, wherein at least one random access channel configuration of the set of random access channel configurations comprises a UE-group common random access channel configuration or at least one scheduling request configuration of the set of scheduling request configurations comprises a UE-group common scheduling request configuration;
   selecting one or more configurations of the set of random access channel configurations or the set of scheduling request configurations based at least in part on receiving the control signaling;
   switching from one or more baseline configurations to the selected one or more configurations, wherein the one or more baseline configurations comprises at least one or more UE-specific configurations, the one or more UE-specific configurations comprising a baseline UE-specific random access channel configuration or a baseline UE-specific scheduling request configuration; and
   performing the wireless communication based at least in part on the switching.

2. The method of claim 1, further comprising:
   enabling a power saving mode based at least in part on selecting the one or more configurations, wherein performing the wireless communication is based at least in part on enabling the power saving mode.

3. The method of claim 1, wherein:
   the one or more configurations comprises a UE-specific random access channel configuration, and
   the one or more baseline configurations comprises the baseline UE-specific random access channel configuration.

4. The method of claim 1, wherein:
   the one or more configurations comprises the UE-group common random access channel configuration, and
   the one or more baseline configurations comprises a baseline UE-group common random access channel configuration.

5. The method of claim 1, wherein:
   the one or more configurations comprises a UE-specific scheduling request configuration, and
   the one or more baseline configurations comprises the baseline UE-specific scheduling request configuration.

6. The method of claim 1, wherein:
   the one or more configurations comprises the UE-group common scheduling request configuration, and
   the one or more baseline configurations comprises a baseline UE-group common scheduling request configuration.

7. The method of claim 1, wherein receiving the control signaling comprises:
receiving a radio resource control message indicating the set of configurations comprising one or more of the set of random access channel configurations or the set of scheduling request configurations.

8. The method of claim 1, further comprising:
transmitting information associated with a capability of the UE to select between different random access channel configurations or different scheduling request configurations,
wherein receiving the control signaling is based at least in part on transmitting the information.

9. The method of claim 1, further comprising:
receiving an indication of one or more random access channel configurations of the set of random access channel configurations or one or more scheduling request configurations of the set of scheduling request configurations,
wherein selecting the one or more configurations is based at least in part on receiving the indication.

10. The method of claim 9, wherein receiving the indication comprises:
receiving downlink control information that includes the indication,
wherein selecting the one or more configurations is based at least in part on receiving the downlink control information.

11. The method of claim 10, wherein:
the downlink control information comprises a UE-specific downlink control information format; and
the UE-specific downlink control information format is based at least in part on the downlink control information scheduling one or more of a physical uplink shared channel or a physical downlink shared channel.

12. The method of claim 10, wherein the downlink control information comprises a UE-group downlink control information format.

13. The method of claim 9, further comprising:
monitoring a physical downlink control channel based at least in part on a capability of the UE,
wherein receiving the indication is based at least in part on monitoring the physical downlink control channel.

14. The method of claim 9, wherein receiving the indication comprises:
receiving a medium access control-control element that includes the indication,
wherein selecting the one or more configurations is based at least in part on receiving the medium access control-control element.

15. The method of claim 1, wherein the one or more configurations correspond to a separate power mode different than a baseline power mode associated with at least one of the one or more baseline configurations.

16. The method of claim 1, wherein:
the set of random access channel configurations comprises one or more UE-specific random access channel configurations and one or more UE-group common random access channel configurations; and
the set of scheduling request configurations comprises one or more UE-specific scheduling request configurations and one or more UE-group common scheduling request configurations.

17. A method for wireless communication at a network entity, comprising:
transmitting, to a user equipment (UE), control signaling indicating a set of configurations comprising a set of random access channel configurations or a set of scheduling request configurations, wherein at least one random access channel configuration of the set of random access channel configurations comprises a UE-group common random access channel configuration or at least one scheduling request configuration of the set of scheduling request configurations comprises a UE-group common scheduling request configuration;
selecting one or more configurations of the set of random access channel configurations or the set of scheduling request configurations based at least in part on transmitting the control signaling;
switching from a first operating mode associated with one or more baseline configurations to a second operating mode associated with the selected one or more configurations, wherein the one or more baseline configurations comprises at least one or more UE-specific configurations, the one or more UE-specific configurations comprising a baseline UE-specific random access channel configuration or a baseline UE-specific scheduling request configuration; and
performing the wireless communication based at least in part on the switching.

18. The method of claim 17, wherein transmitting the control signaling comprises:
transmitting a radio resource control message indicating the set of configurations comprising one or more of the set of random access channel configurations or the set of scheduling request configurations.

19. The method of claim 17, further comprising:
receiving information associated with a capability of the UE to select between different random access channel configurations or different scheduling request configurations,
wherein transmitting the control signaling is based at least in part on receiving the information.

20. The method of claim 17, further comprising:
transmitting an indication of one or more random access channel configurations of the set of random access channel configurations or one or more scheduling request configurations of the set of scheduling request configurations,
wherein selecting the one or more configurations is based at least in part on transmitting the indication.

21. The method of claim 20, wherein transmitting the indication comprises:
transmitting downlink control information that includes the indication,
wherein selecting the one or more configurations is based at least in part on transmitting the downlink control information.

22. The method of claim 21, wherein:
the downlink control information comprises a UE-specific downlink control information format; and
the UE-specific downlink control information format is based at least in part on the downlink control information scheduling one or more of a physical uplink shared channel or a physical downlink shared channel.

23. The method of claim 21, wherein the downlink control information comprises a UE-group downlink control information format.

24. The method of claim 20, wherein transmitting the indication comprises:
transmitting a medium access control-control element that includes the indication, wherein selecting the one or more configurations is based at least in part on transmitting the medium access control-control element.

25. The method of claim 17, wherein the first operating mode corresponds to a baseline power mode and the second operating mode correspond to a separate power mode different than the baseline power mode.

26. The method of claim 17, further comprising:
enabling a power saving mode based at least in part on selecting the one or more configurations,
wherein performing the wireless communication is based at least in part on enabling the power saving mode.

27. The method of claim 17, wherein the set of random access channel configurations comprises one or more UE-specific random access channel configurations and one or more UE-group common random access channel configurations.

28. The method of claim 17, wherein the set of scheduling request configurations comprises one or more UE-specific scheduling request configurations and one or more UE-group common scheduling request configurations.

29. An apparatus for wireless communication at a user equipment (UE), comprising:
a processor; and
memory coupled with the processor, the processor configured to:
receive, from a network entity, control signaling indicating a set of configurations comprising a set of random access channel configurations or a set of scheduling request configurations, wherein at least one random access channel configuration of the set of random access channel configurations comprises a UE-group common random access channel configuration or at least one scheduling request configuration of the set of scheduling request configurations comprises a UE-group common scheduling request configuration;
select one or more configurations of the set of random access channel configurations or the set of scheduling request configurations based at least in part on receiving the control signaling;
switch from one or more baseline configurations to the selected one or more configurations, wherein the one or more baseline configurations comprises at least one or more UE-specific configurations, the one or more UE-specific configurations comprising a baseline UE-specific random access channel configuration or a baseline UE-specific scheduling request configuration; and
perform the wireless communication based at least in part on the switching.

30. An apparatus for wireless communication at a network entity, comprising:
a processor; and
memory coupled with the processor, the processor configured to:
transmit, to a user equipment (UE), control signaling indicating a set of configurations comprising a set of random access channel configurations or a set of scheduling request configurations, wherein at least one random access channel configuration of the set of random access channel configurations comprises a UE-group common random access channel configuration or at least one scheduling request configuration of the set of scheduling request configurations comprises a UE-group common scheduling request configuration;
select one or more configurations of the set of random access channel configurations or the set of scheduling request configurations based at least in part on transmitting the control signaling;
switch from a first operating mode associated with one or more baseline configurations to a second operating mode associated with the selected one or more configurations, wherein the one or more baseline configurations comprises at least one or more UE-specific configurations, the one or more UE-specific configurations comprising a baseline UE-specific random access channel configuration or a baseline UE-specific scheduling request configuration; and
perform the wireless communication based at least in part on the switching.

* * * * *